United States Patent [19]
Ballard et al.

[11] Patent Number: 6,140,722
[45] Date of Patent: Oct. 31, 2000

[54] ALTERNATOR SYSTEM

[75] Inventors: Michael D. Ballard, Edmond; Jianing Chen, Oklahoma City; Daniel Joseph Clark; Larry Joe Maddox, both of Edmond, all of Okla.

[73] Assignee: Unit Parts Company, Oklahoma City, Okla.

[21] Appl. No.: 09/376,444

[22] Filed: Aug. 18, 1999

Related U.S. Application Data

[62] Division of application No. 09/317,395, May 24, 1999.
[51] Int. Cl.⁷ .......................... H02K 11/00; H01R 13/627
[52] U.S. Cl. ............................ 310/68 D; 310/71; 439/353
[58] Field of Search ..................................... 310/68 D, 71; 191/2; 336/107, 192; 439/141, 144, 147, 180, 192, 258, 270, 293, 295, 299, 345, 346, 347, 350, 353, 357; 363/142, 143, 144, 145

[56] References Cited

U.S. PATENT DOCUMENTS

| | | | |
|---|---|---|---|
| 3,467,942 | 9/1969 | Dell et al. ................... | 339/49 |
| 4,851,725 | 7/1989 | Keck .......................... | 310/71 |
| 4,925,398 | 5/1990 | Samejima et al. ....................... | 439/357 |
| 4,937,482 | 6/1990 | Donogne ................... | 310/71 |
| 5,017,818 | 5/1991 | Dohogne ................... | 310/71 |
| 5,821,674 | 10/1998 | Weiner ................... | 310/68 D |

*Primary Examiner*—Nestor Ramirez
*Assistant Examiner*—Dang Dinh Le
*Attorney, Agent, or Firm*—Dunlap, Codding & Rogers, P.C.

[57] ABSTRACT

An improved alternator system for replacing an OEM Ford IAR alternator system. The improved alternator system includes a rectifier with increased heat dissipation qualities and decreased heat generation qualities and configured to maintain secure electrical connections. The alternator system is further configured to provide optimum electrical output by providing the rotor and the stator with additional turns or windings of heavier gauge wire whereby the alternator is capable of inducing a stabilized output current of at least about 52 amperes of current at about 1600 revolutions per minute of the rotor.

12 Claims, 18 Drawing Sheets

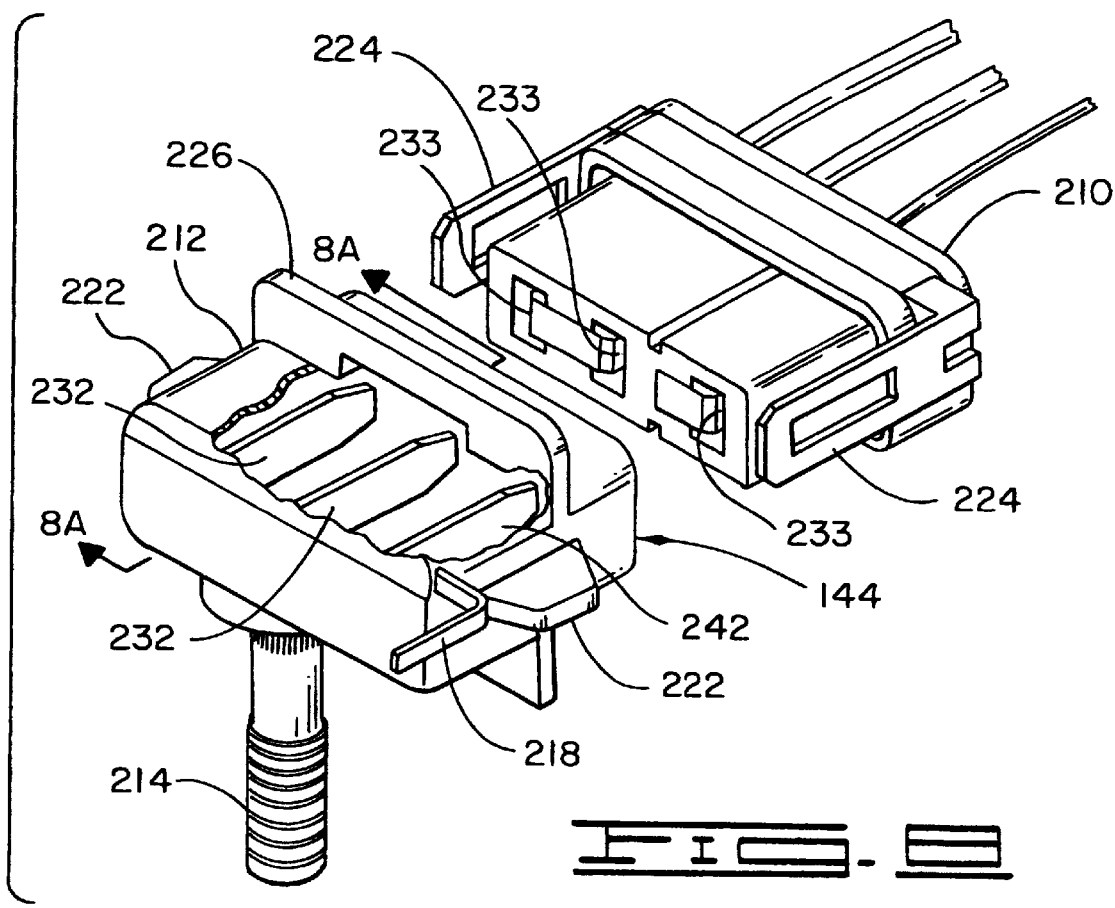

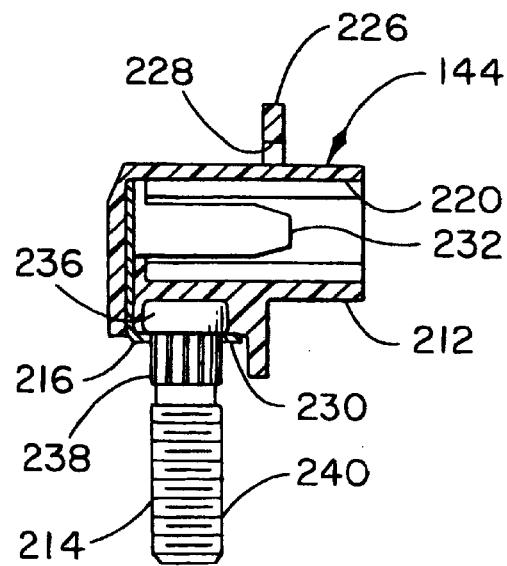
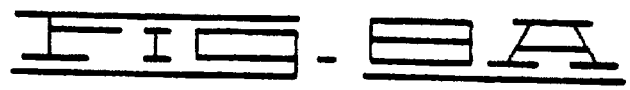
FIG. 8A
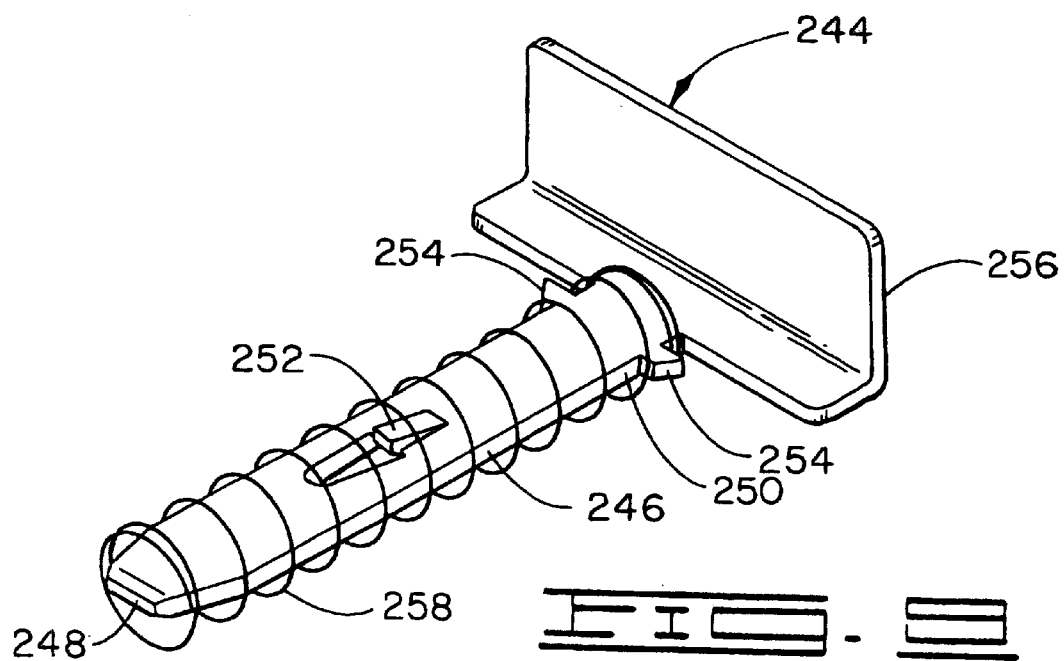
FIG. 8

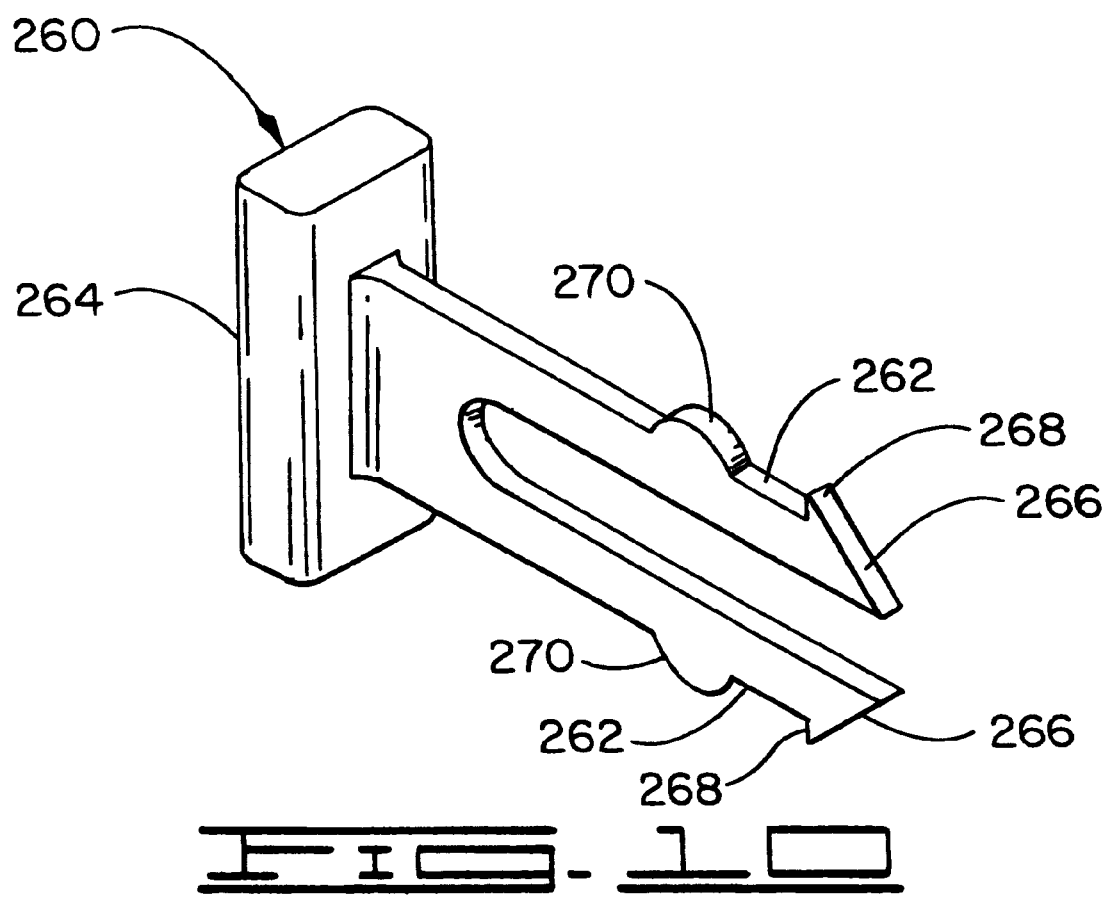

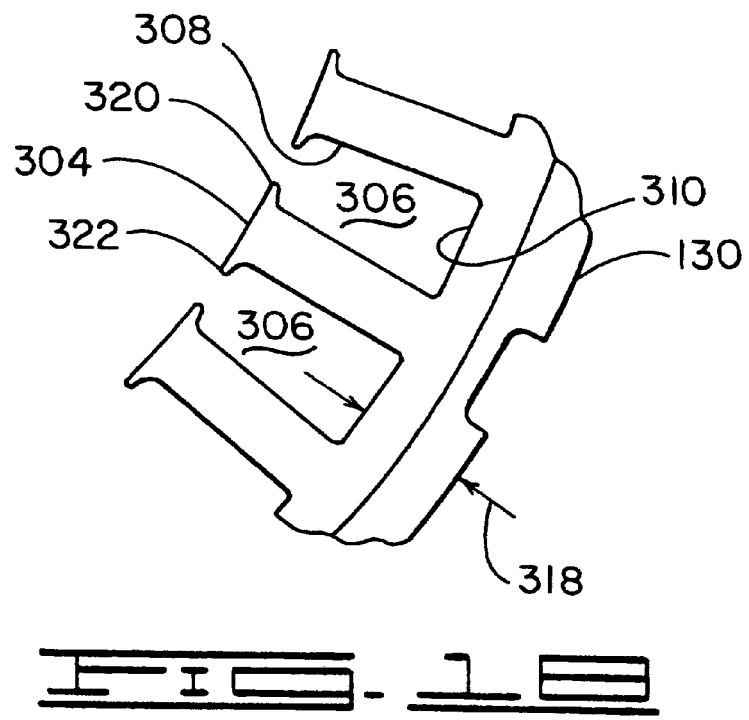
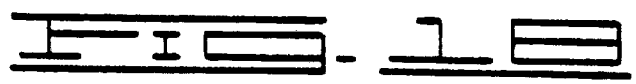
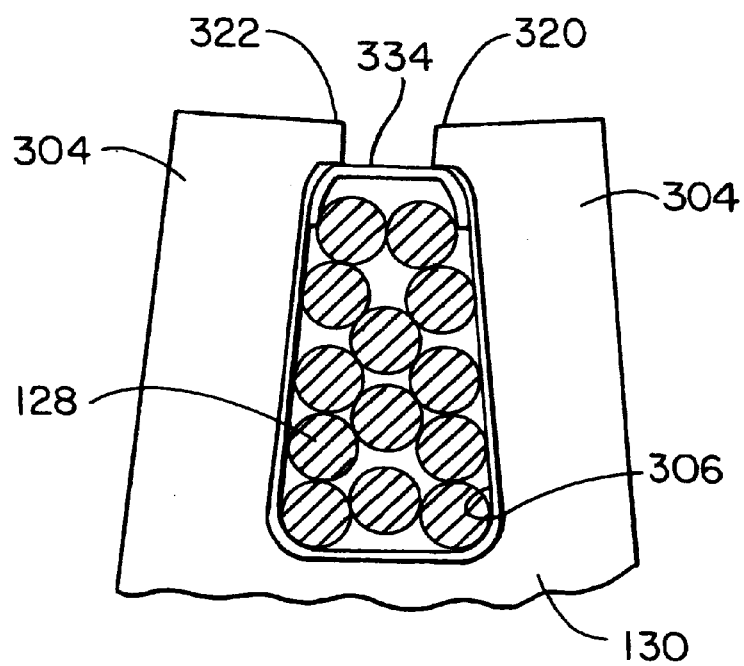
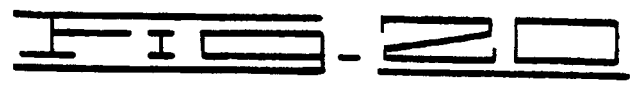

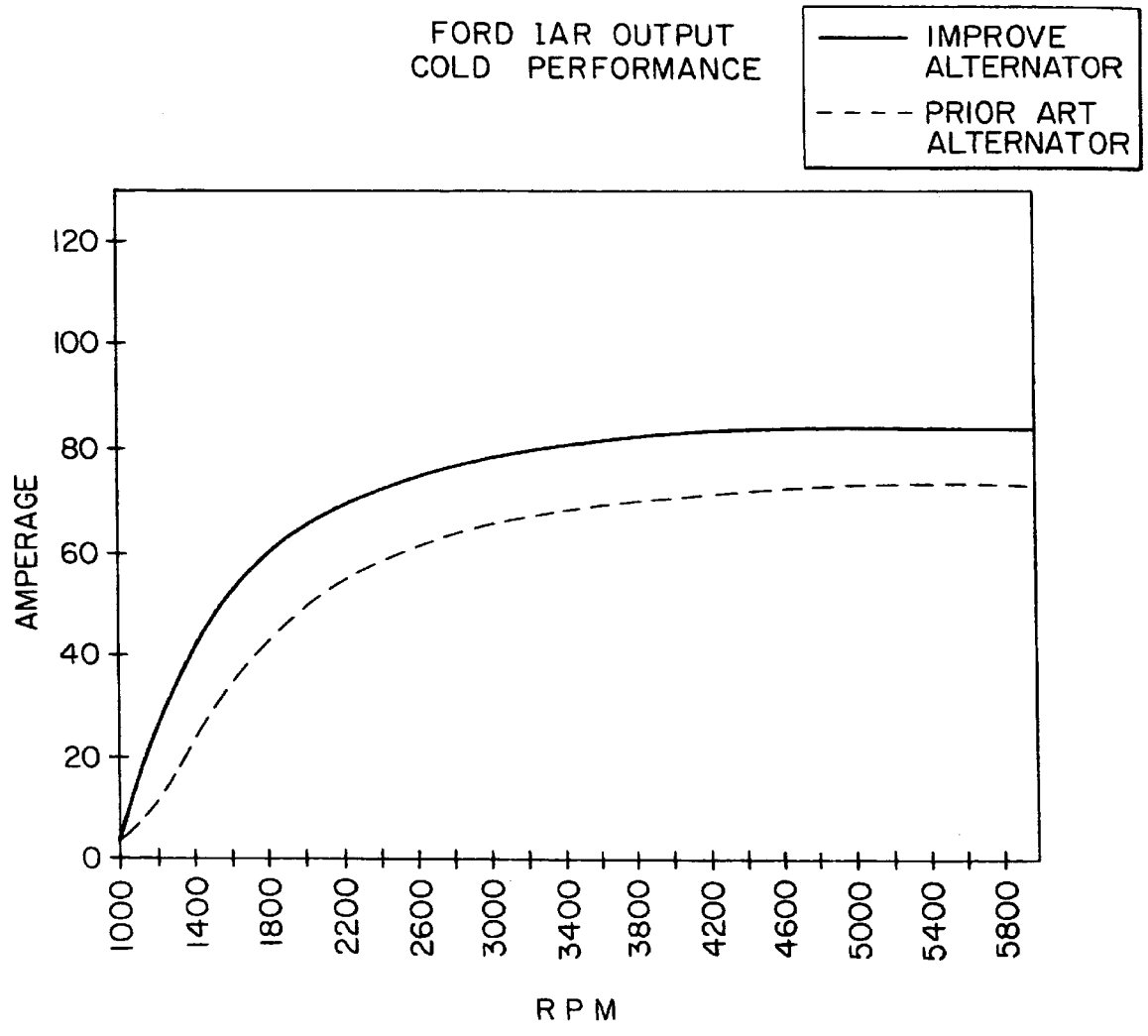
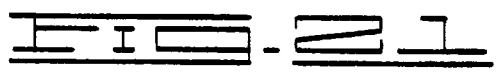

ALTERNATOR SYSTEM

CROSS-REFERENCE TO RELATED APPLICATIONS

This is a divisional of copending application Ser. No. 09/317,395 filed on May 24, 1999.

STATEMENT REGARDING FEDERALLY SPONSORED RESEARCH OR DEVELOPMENT

Not applicable.

BACKGROUND OF THE INVENTION

1. Field of the Invention

The present invention relates generally to alternator systems for automobiles, and more particularly, but not by way of limitation, to an improved alternator system for replacing an OEM Ford IAR alternator system.

2. Brief Description of the Prior Art

Automobile engines rely on air flow to remove excess heat from various components of the engine. However, many automobiles are being designed with body styling in mind rather than engine performance. In addition, government imposed regulations on vehicle emissions and C.A.F.E. standards further control engine designs. In short, to accommodate consumer demands for appealing body styles and to comply with governments regulations, air flow through the engine compartment is often compromised. The result is that engines are operating at much higher temperatures.

One particular victim of this heated environment is the Ford IAR alternator. The problem is evidenced by a warranty return rate of as high as 40%–50% on the Ford IAR alternator with the majority of these returns being due to certain components, such as the rectifier and the voltage regulator overheating and in turn failing.

Another significant cause of the failure of the Ford IAR alternator results from poor electrical connections. More specifically, the rectifier used with the Ford IAR alternator for rectifying the output of the alternator is connected to the vehicle battery via a wiring harness having a plurality of receptacles with metal clip inserts. The rectifier has a plurality of corresponding spades or prongs which are slidably mateable with the clip inserts of the wiring harness. The problem encountered is that the inserts of the wiring harness have a tendency to expand which results in a loose connection between the rectifier and the wiring harness. A consequence of the loose connection can be the formation of an electric arc between the rectifier and the wiring harness which can pose a serious fire hazard.

To this end, a need exists for replacing the OEM Ford IAR alternator with an improved alternator that has increased heat dissipation qualities and decreased heat generation qualities and that is configured to maintain secure electrical connections, while providing optimum electrical output. It is to such an improved alternator that the present invention is directed.

BRIEF SUMMARY OF THE INVENTION

In one aspect the present invention is directed to a rectifier in combination with a Ford IAR alternator which is of the type having a rotor coil and a plurality of stator windings housed in a frame having an external mounting surface to which a voltage regulator is mounted and electrically connected to the rotor and an internal mounting surface to which the rectifier is mounted and electrically connected to the stator. The rectifier includes a first plate defining a negative heat sink and a second plate defining a positive heat sink. Each of the negative and positive heat sinks have a plurality of openings dimensioned to receive a diode in a press fit relationship. The rectifier further includes a connector assembly including a connector box having a recess adapted to matingly receive a wiring harness, a B+ post having a first end secured to the connector box, a medial portion electrically connected to the positive heat sink, and a threaded second end extending through the frame of the alternator, and a terminal having a first end electrically connected to the B+ post and a second end including a pair of prongs disposed in the recess of the frame.

In another aspect, the present invention is directed to a plug connector adapted to engage the connector box to secure the wiring harness to the connector box. The plug lock includes a base having a surface engagable with a portion of the wiring harness and a pair of tines extending from the base in a spaced apart, parallel relationship. The tines are positionable through a slot of the connector box and each tine has an outwardly extending protrusion spaced from the base such that the protrusions are retainingly enagagable with a portion of the tab so as to cooperate with the base to secure the wiring harness to the connector box when the wiring harness is operably connected to the connector box of the rectifier.

Yet another aspect of the present invention is to provide an alternator configured to provide optimum electrical output by providing the rotor and the stator with additional turns or windings of heavier gauge wire whereby the alternator is capable of inducing an output current of at least about 52 amperes of current at about 1600 revolutions per minute of the rotor.

The present invention is also directed to a method for modifying a Ford IAR alternator of the type where the voltage regulator receives signals indicative of the alternator voltage output voltage via the battery by (a) providing the voltage regulator with a B+ terminal; (b) extending a post from a positive heat sink of the rectifier and through the frame of the alternator; and (c) attaching a lead between the B+ terminal of the voltage regulator and the terminal post so as to establish electrical conductivity and communication between the positive heat sink of the rectifier and the B+ terminal of the voltage regulator whereby the voltage regulator receives signals indicative of the voltage output of the alternator directly via the positive heat sink of the rectifier.

The objects, features and advantages of the present invention will become apparent from the following detailed description when read in conjunction with the accompanying drawings and appended claims.

BRIEF DESCRIPTION OF THE SEVERAL VIEWS OF THE DRAWING

FIG. 6 is a sectional view of a portion of the negative heat sink showing a diode secured therein.

FIG. 8 is a perspective view of a connector assembly and a portion a wiring harness.

FIG. 8A is a sectional view taken at line 8A—8A in FIG. 8.

FIG. 9 is a perspective view of a rectifier plug tester constructed in accordance with the present invention.

FIG. 10 is a perspective view of a plug lock constructed in accordance with the present invention.

FIG. 18 is a fragmental plan view of a portion of the stator lamination of FIG. 17.

FIG. 20 is a fragmental plan view of a portion of the stator assembly of FIG. 19 showing twelve stator windings of #14AWG wire disposed in each slot formed in the stator lamination of FIG. 15.

FIG. 21 is graphical representation comparing the electrical current output by the prior art alternator of FIG. 1 and the electrical current output by the alternator of the present invention.

DETAILED DESCRIPTION OF THE INVENTION

Figure 1:
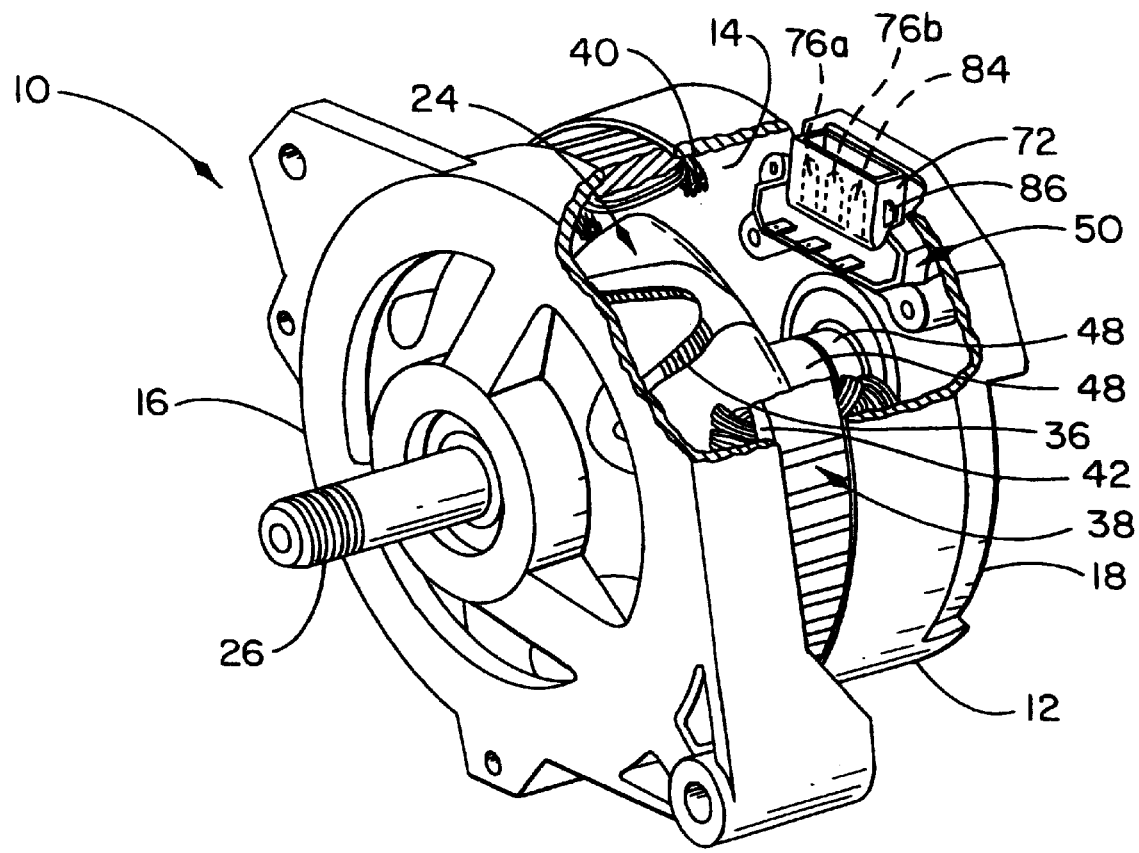
FIG. 1 is a partially cutaway perspective view of a prior art Ford IAR alternator.

Referring now to the drawings, and more particularly to FIG. 1, a typical Ford IAR alternator 10 for use with an engine of an automobile is shown. The alternator 10 has a housing 12 defining an alternator interior space 14. The housing 12 includes a drive end frame 16 and a slip ring end frame 18.

The alternator interior space 14 of the housing 12 is adapted to receive a rotor 24 having a drive shaft 26 rotatably supported by the housing 12. The rotor 24 of the alternator 10 includes a rotor coil 36, in which a magnetic field is generated. A stator 38 is positioned about the rotor coil 36 so as to be positioned in the magnetic field generated by the rotor coil 36. The stator 38 has a plurality of stator windings 40 wound about a stator lamination 42, typically in a three-phase configuration. The rotor coil 36 is mounted on the drive shaft 26 which is rotated by the automobile's engine so that an electric current is induced in the stator windings 40.

A voltage regulator (not shown) is electrically connected to the rotor coil 36 via slip rings 48 provided on the drive shaft 26 of the rotor 24. The voltage regulator functions to control the intensity of the magnetic field generated by the rotor coil 36 so that the voltage output of the alternator 10 is maintained within predefined limits. The voltage regulator is mounted to the exterior surface of the slip ring end frame 18 of the housing 12 and extended through the slip ring end frame 18 so as to be electrically connected to the rotor coil 36 via slip rings 48.

To convert the alternating current induced in the stator windings 40 to direct current, a rectifier 50 is electrically connected to the stator windings 40. The rectifier 50 is mounted to an interior surface of the slip ring end frame 18.

Figure 2:
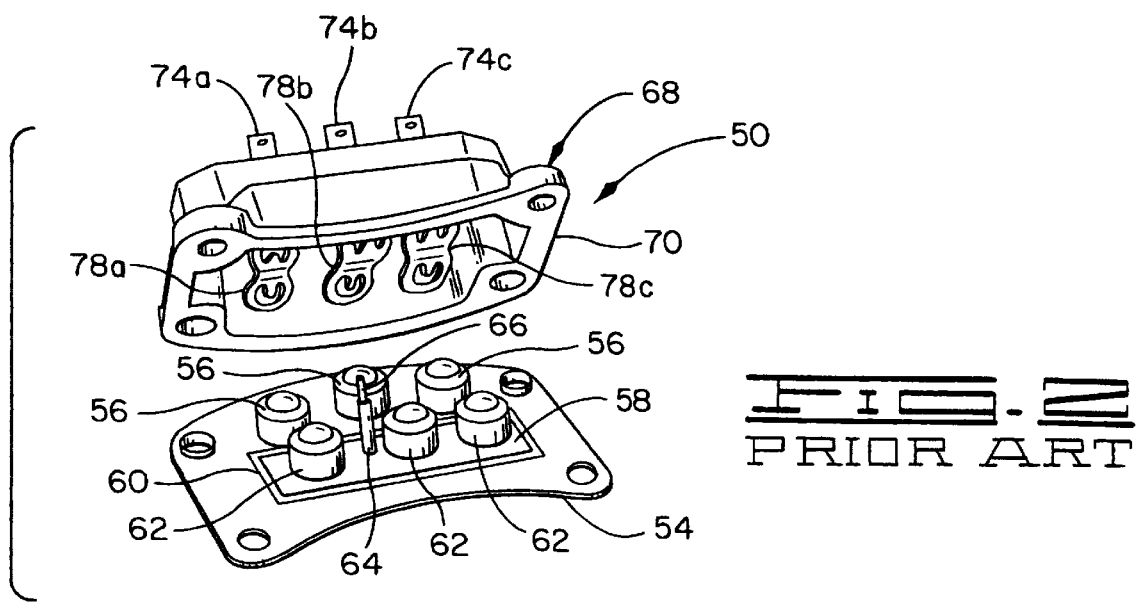
FIG. 2 is an exploded, perspective view of a rectifier employed in the alternator of FIG. 1.

FIG. 2 illustrates the rectifier 50 employed in the alternator 10 in greater detail. The rectifier 50 includes a thin negative heat sink 54 having three negative diodes 56 soldered to one side thereof. The rectifier 50 further includes a positive connector plate 58 mounted to the negative heat sink 54 with an insulator 60 interposed between the negative heat sink 54 and the positive connector plate 58. Three positive diodes 62, each corresponding with one of the negative diodes 56, are soldered to the positive connector plate 58. A post or terminal 64 is soldered to the connector plate 58 such that the terminal 64 extends from positive connector plate 58. As illustrated in FIG. 2, the terminal 64 has a distal end 66, which has a diameter less than the remainder of the terminal 64. The significance of this will be discussed below.

The rectifier 50 further includes a cover assembly 68. The cover assembly 68 comprises a cover portion 70, a connector portion 72 (FIG. 1), a plurality of leads 74a–74c, and a pair of prongs 76a and 76b (FIG. 1) electrically connected to the terminal 64. The cover portion 70 is configured to cooperate with the negative heat sink 54 to encompass the negative diodes 56 and the positive diodes 62.

Each of the leads 74a–74c includes a contact portion 78a–78c, respectively, which is electrically connected to a pair of corresponding positive and negative diodes. Each of the leads 74a–74c extends through the cover portion 70 and is adapted to be slidably connected to one of the stator windings 40.

The prongs 76a and 76b are embedded in the cover portion 70 and electrically connected to the distal end 66 of the terminal 64 when the cover assembly 68 is connected to the negative heat sink 54. The cover assembly 68 includes a third prong 84 which is electrically connected to the lead 74a. The connector portion 72 is provided with a pair of ears 86 for retaining a wiring harness (not shown) which is in turn connected to the battery of the vehicle.

As mentioned above, a primary reason for failure of the Ford IAR alternator is overheating of the rectifier. The design of the rectifier 50 described above is the cause of many heat related problems with the Ford IAR alternator. First, the thin profile of the negative heat sink 54 and the positive connector plate 58 is such that heat is not able to be effectively dissipated from the diodes. Second, due to the differences in mass and reflow temperatures of the various materials utilized in the rectifier 50, the solder joints throughout the rectifier 50 end up with a certain degree of porosity which provides heat insulating properties rather than heat conduction properties. Third, the configuration of the terminal 64 with its small distal end 66 poses a heat related problem in that a significant amount of heat is generated at the distal end of the terminal 64 because all the current from the connector plate 58 must flow through the terminal 64.

Another problem experienced in the use of the rectifier 50 is that the prongs are adapted to be slidably mateable with corresponding clips of the wiring harness. The clips have a tendency to expand and thus result in loose electrical connections. A consequence of these loose connections is the formation of an electrical arc which poses a serious fire hazard.

Problems with the power output of the alternator 10 have also been encountered. That is, the voltage regulator controls the intensity of the magnetic filed generated by the rotor coil 36 so that the output voltage of the alternator 10 remains within predefined limits. However, as the engine speed varies, the current of the electricity produced by the alternator also varies. That is, as the engine speed is reduced, the electrical current produced by the alternator is also reduced, and as the engine speed is increased, the electrical current produced by the alternator is also increased.

The output of the alternator is electrically connected to the battery of the vehicle and the electrical system of a vehicle to recharge the battery and to meet the current demands of the electrical system. However, if the alternator is not generating a sufficient amount of electrical current to meet the demands of the electrical system, then the electrical system draws electrical current from the battery to meet this deficiency.

The alternator 10 typically produces a sufficient amount of electrical current to effectively charge the battery and to meet the demands of the electrical system when the alternator 10 is operating at high speeds. However, when the alternator 10 is operating at idle or low speeds, the alternator 10 produces an insufficient amount of electrical current to meet the demands of the electrical system. Thus, the battery supplies electrical current to the electrical system when the engine is operating at low speeds which shortens the useful life of the battery.

Figure 3:
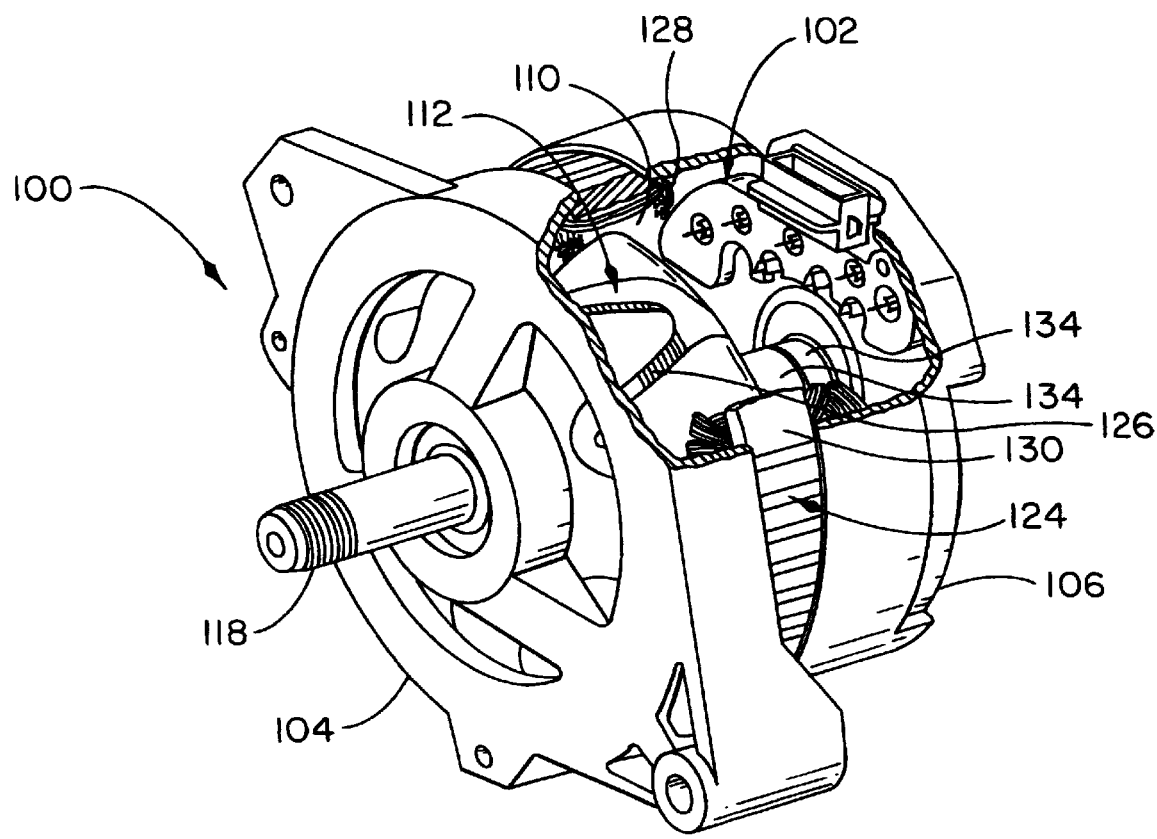
FIG. 3 is a partially cutaway, perspective view of a replacement alternator constructed in accordance with the present invention.

FIG. 3 is a perspective view of an improved alternator 100 which is constructed to replace the prior art Ford IAR alternator 10 described above. The replacement alternator 100 of the present invention includes an improved rectifier 102 which provides the advantage of increased heat dissipation and which is configured to maintain secure electrical connections. The alternator 100 further provides an output current of about 52 amperes at about 1600 rpms which is about 53 percent more electrical current at about 1600 rpms than the prior art alternator 10 discussed above, which permits the replacement alternator 100 of the present invention to meet or exceed the demands of the electrical system of the vehicle at low or idle speeds of the replacement alternator 100. Thus, the alternator 100 of the present invention extends the useful life of the battery of the vehicle and thereby represents an advancement in the state of the art relating to alternators.

The alternator 100 includes a drive end frame 104 and a slip ring end frame 106. The drive end frame 104 and the slip ring end frame 106 define an alternator interior space 110 adapted to receive a rotor 112 which is constructed in accordance with the present invention. The drive end frame 104 is adapted to rotatably support one end of a drive shaft 118 of the rotor 112 while the slip ring end frame 106 is adapted to rotatably support the other end of the drive shaft 118 of the rotor 112.

The alternator 10 further includes a stator 124 which surrounds a rotor coil 126 of the rotor 112 and is positioned in the magnetic field generated by the rotor coil 126. The stator 124 has a plurality of stator windings 128 wound about a stator lamination 130, typically in a three phase configuration. The rotor coil 126 is mounted on the drive shaft 118 which is rotated by the engine of a vehicle so that an electric current is induced in the stator windings 128. The rotor coil 126 and the stator 124 will be described in greater detail below.

A voltage regulator 132 (FIG. 13) is electrically connected to the rotor coil 126 via slip rings 134 provided on the drive shaft 118. The voltage regulator 132 functions to control the intensity of the magnetic field generated by the rotor coil 126 so that the voltage output of the alternator 100 is maintained within predefined limits. The voltage regulator 132 is mounted to the exterior surface of the slip ring end frame 106 and extended through the slip ring end frame 106 so as to be electrically connected to the rotor coil 126 via the slip rings 134.

To convert the alternating current induced in the stator windings 128 to direct current, the rectifier 102 is electrically connected to the stator windings 128. The rectifier 102 is mounted to an interior surface of the slip ring end frame 106.

Figure 4:
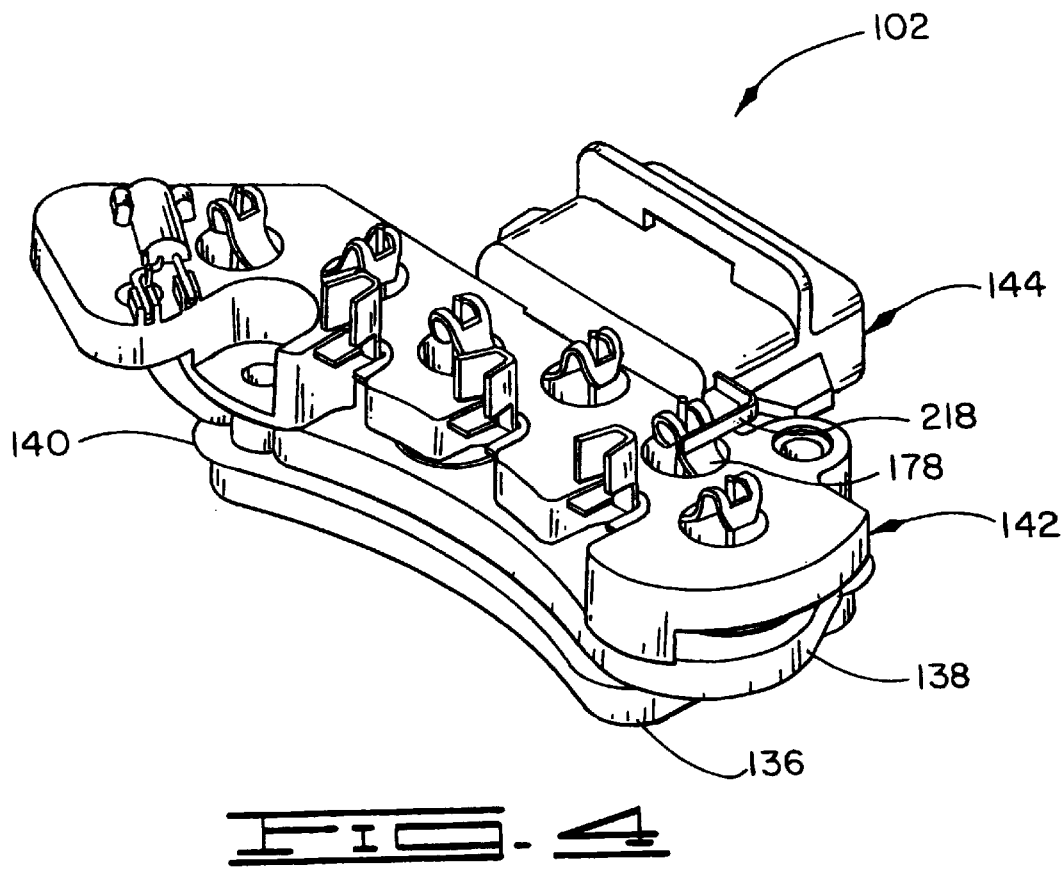
FIG. 4 is a perspective view of a rectifier constructed in accordance with the present invention.
Figure 5:
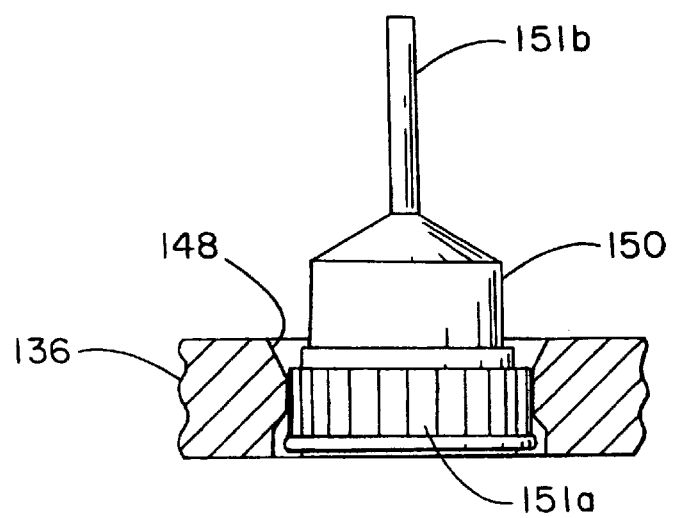
FIG. 5 is an exploded, perspective view of the rectifier of FIG. 4.
Figure 5:
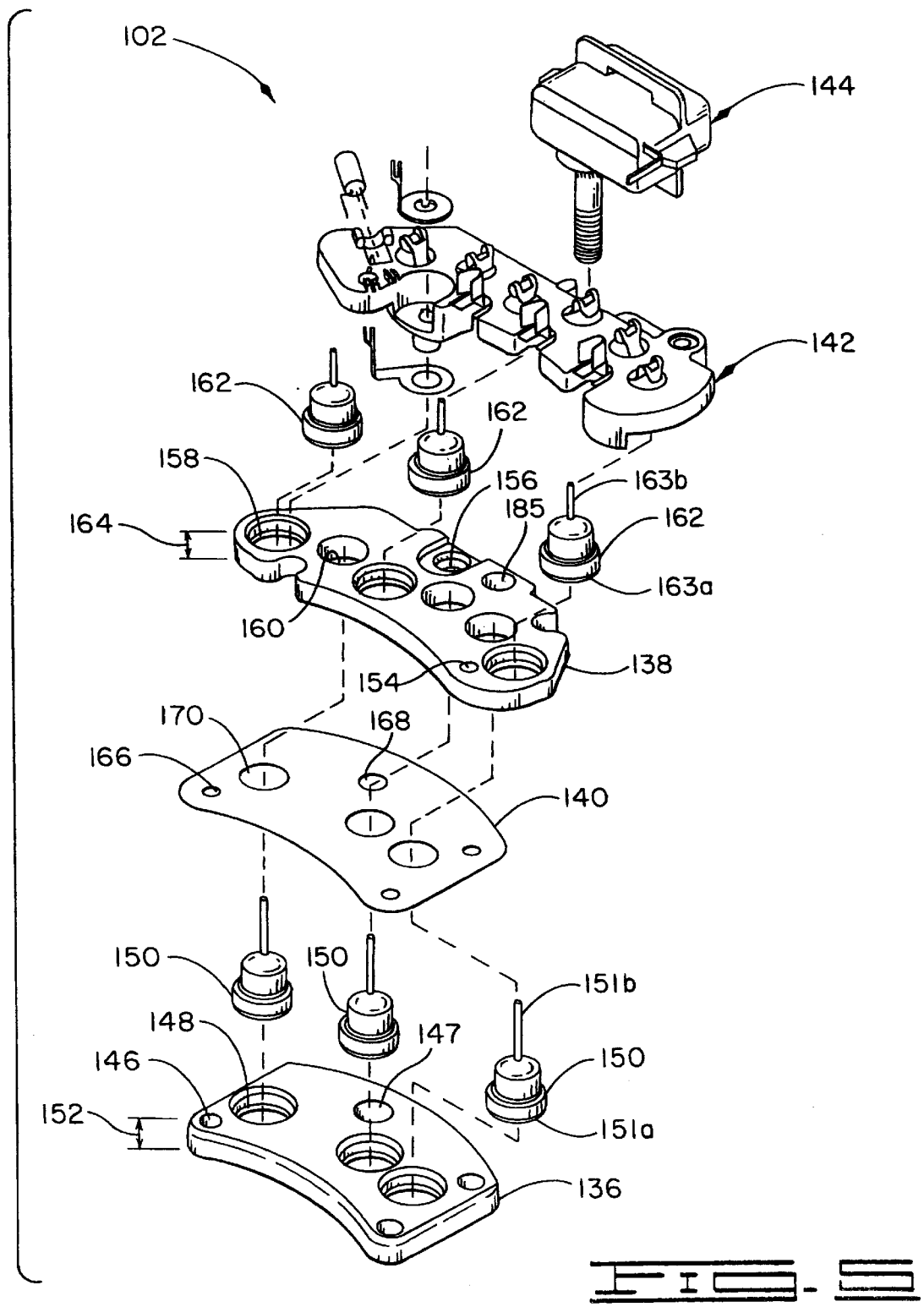

Referring now to FIGS. 4 and 5, the rectifier 102 includes a negative heat sink 136, a positive heat sink 138, an insulator 140, a terminal assembly 142, and a connector assembly 144. As best shown in FIG. 5, the negative heat sink 136 is configured to be mounted to the interior surface of the slip ring end frame 106. The negative heat sink 136 is provided with a plurality of mounting holes 146, a screw receiving opening 147, and a plurality of diode receiving openings 148 (only one being designated in FIG. 5). The diode receiving openings 148 are dimensioned to receive a corresponding negative diode 150; each negative diode 150 having a base 151a and a terminal 151b. To eliminate the above mentioned problems associated with solder connections, the diode receiving openings 148 are dimensioned such that the base 151a of the negative diodes 150 are press fit into the diode receiving openings 148 of the negative heat sink 136, as shown in FIG. 6.

To more effectively conduct heat away from the negative diodes 150, the negative heat sink 136 is fabricated of a heat conductive material, such as aluminum, and is formed to have a thickness 152 greater than about 5 mm, and preferably about 6 mm. By fabricating the negative heat sink 136 of a heat conductive material and making the negative heat sink 136 significantly thicker than the negative heat sink 54 of the rectifier 50 described above, heat generated by the flow of electric current through the negative diodes 150 is more effectively conducted away from the negative diodes 150 and thus the negative diodes 150 are less likely to fail due to overheating.

The positive heat sink 138 is constructed and fabricated in a manner similar to the negative heat sink 136. That is, the positive heat sink 138 includes a mounting hole 154, a screw receiving opening 156, and a plurality of positive diode receiving openings 158 (only one being designated in FIG. 5) which are offset from the negative diode receiving openings 148 of the negative heat sink 136 when the positive heat sink 138 is mounted to the negative heat sink 136. The positive heat sink 138 is further provided with a plurality of negative diode receiving openings 160 (only one being designated in FIG. 5) which are in alignment with the negative diode receiving openings 148 of the negative heat sink 136 when the positive heat sink 138 is mounted to the negative heat sink 136 so as to receive the negative diodes 150 extending from the negative heat sink 136.

The mounting hole 154 is in alignment with one of the mounting holes 146 and the screw receiving opening 156 is in alignment with the screw receiving opening 147 when the positive heat sink 138 is mounted to the negative heat sink 136. Like the negative diode receiving openings 148 of the negative heat sink 136, the positive diode receiving openings 158 of the positive heat sink 138 are dimensioned to receive a corresponding positive diode 162 such that the positive diodes 162 is press fit in the positive diode receiving openings 158. Each of the positive diodes 162 has a base 163a and a terminal 163b.

Like the negative heat sink 136, the positive heat sink 138 is fabricated of a heat conductive material, such as aluminum, and has a thickness 164 greater than about 5 mm, and preferably about 6 mm.

The insulator 140 is configured to be positioned between the negative heat sink 136 and the positive heat sink 138 so as to electrically insulate the negative heat sink 136 from the positive heat sink 138. The insulator 140 is provided with a plurality of mounting holes 166, a screw receiving opening 168, and a plurality of negative diode receiving openings 170. The mounting holes 166 are aligned with the mounting holes 154 and the mounting holes 146 while the screw receiving opening 168 is in alignment with the screw receiving opening 156 and the screw receiving opening 147 when the positive heat sink 138 is mounted to the negative heat sink 136 with the insulator 140 interposed therebetween. Also, the negative diode receiving openings 170 are in alignment with the negative diode receiving openings 148 of the negative heat sink 136 so as to receive the negative diodes 150 extending from the negative heat sink 136.

The insulator 140 has a thickness less than about 0.020 mm, and preferably about 0.009 mm. This thin profile of the insulator 140 further promotes heat transfer through the insulator 140 and thus away from the negative diodes 150 and the positive diodes 162.

Figure 7A:
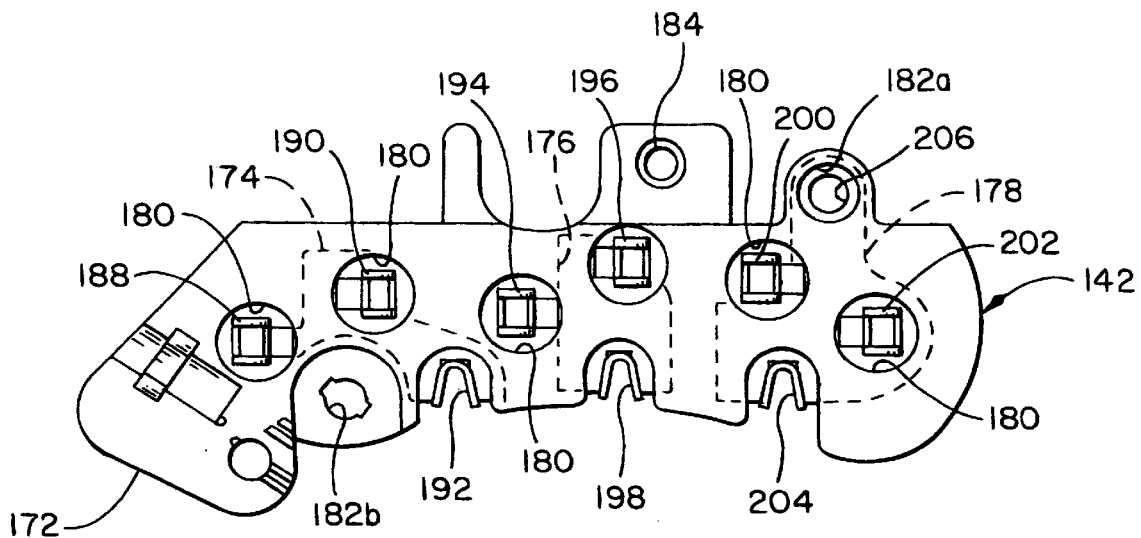
FIG. 7A is top view of a rectifier cover assembly.
Figure 7B:
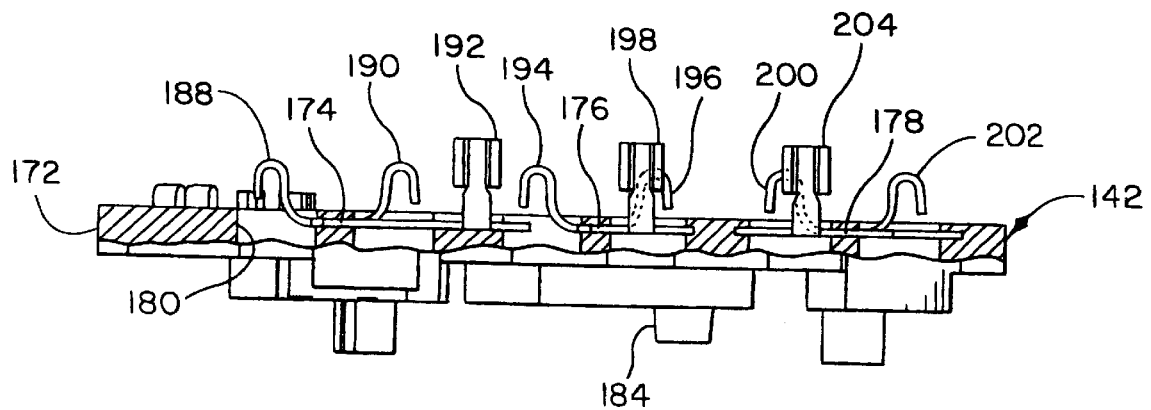
FIG. 7B is a partially cutaway, side elevational view of the rectifier cover assembly of FIG. 7A.

Referring now to FIG. 7A and FIG. 7B, the terminal assembly 142 includes a cover 172 and a plurality of AC inserts 174, 176, 178. The cover 172 is preferably fabricated of a plastic material and is provided with a plurality of diode receiving openings 180. The diode receiving openings 180 are formed in the cover 172 such that the diode receiving opening 180 are alignment with the negative diodes 150 and the positive diodes 162 when the cover 172 is mounted to the positive heat sink 138 in the manner illustrated in FIG. 4. The cover 172 further includes a pair of mounting holes 182a and 182b, and an alignment tab 184 alignable with an alignment hole 185.

Each of the AC inserts 174, 176, 178 is constructed of an electrical conductive material, such as steel, aluminum or copper, and is formed in the cover 172. Each AC insert 174–178 includes a pair of diode connectors and a stator connector. More specifically, the AC insert 174 is provided with a diode connector 188 and a diode connector 190. The diode connector 188 is adapted to provide a crimp and weld connection with the terminal of one of is the positive diodes 162, while the diode connector 190 is adapted to provide a crimp and weld connection with the terminal of a corresponding one of the negative diodes 150. The AC insert 174 further includes a stator connector 192 which is adapted to provide a crimp and solder connection with one of the stator windings 128.

Similar to the AC insert 174, the AC insert 176 includes a diode connector 194, a diode connector 196, and a stator connector 198, and the AC insert 178 includes a diode connector 200, a diode connector 202, and a stator connector 204. The AC insert 178 further includes a contact portion 206 extending into the mounting hole 182a and provided with an opening 208.

The crimp and weld connections described above avoid the use of solder connections thereby eliminating solder reflow and disconnectivity problems experienced with solder connections and thus enhancing the durability and reliability of the rectifier. Furthermore, the press-fit connection of the diodes to the heat sinks avoids the use of solder connections, thereby eliminating the heat transfer problems experienced with solder connections and enhancing the heat transfer from the negative diodes and the positive diodes.

The reliability of the rectifier 102 of the alternator 100 of the present invention was compared to the rectifier 50 of the prior art alternator 10 by operating each of the rectifiers through alternating temperature cycles. One cycle was defined as running electric current through each rectifier so as to increase the temperature from 40 C to 200 C and then allowing the temperature of each rectifier to return to 40 C. The solder joints of the rectifier 50 of the prior art alternator 10 failed after 308 cycles. In contrast, the rectifier 102 of the alternator 100 operated for 6,300 cycles prior to failing.

Referring now to FIGS. 8 and 8A, the connector assembly 144 is shown in conjunction with a wiring harness 210 which in turn is connectable to the battery (not shown) of a vehicle. The connector assembly 144 includes a connector box 212, a screw or B+ post 214, a terminal 216, and a terminal 218. The connector box 212 is provided with a recess 220 adapted to matingly receive a portion of the wiring harness 210. The connector box 212 further includes a pair of oppositely disposed ears 222 adapted to cooperate with a pair of connector clips 224 of the wiring harness 210 to secure the wiring harness 210 to the connector assembly 144. The connector box 212 is further provided with a tab 226 having a slot 228 formed therethrough.

The terminal 216 is formed in the rearward portion of the connector box 212 with a portion of the terminal 216 being disposed near the bottom end of the connector box 212 and another portion extending into the recess 220 of the connector box 212. More specifically, the terminal 216 includes a first end 230 which is adapted to be electrically connected to the screw 214 (described below) and a second end which includes a pair of spades or prongs 232 extending into the recess 220 of the connector box 212 so as to be slidably mateable with a pair of corresponding receptacles 233 of the wiring harness 210.

As described above, a problem encountered with prior art rectifiers is that the clip inserts (not shown) which are disposed in the receptacles 233 of the wiring harness 210 have a tendency to expand due to heat under the hood of a vehicle during normal operating conditions thereby resulting in a loose connection between the rectifier 102 and the wiring harness 210. A consequence of a loose connection can be the formation of an electric arc between the rectifier and the wiring harness. The prongs 76a and 76b described above in reference to the prior art rectifier 50 have a thickness of approximately 0.8 mm. To enhance the grip on the prongs 232, the prongs 232 of the rectifier 102 are provided with slightly thicker thickness of approximately 0.9 mm.

The screw 214 has an enlarged head portion 236 embedded in the connector box 212, a knurled intermediate portion 238, and a threaded portion 240. The screw 214 extends from the connector box 212 with the first end 230 of the terminal 216 in electrical contact with the intermediate portion 238 thereof and the enlarged portion 236. When the connector assembly 144 is assembled with the terminal assembly 142, the positive heat sink 138, the insulator 140, and the negative heat sink 136, the screw 214 is extended through screw receiving opening 156, screw receiving opening 168, and screw receiving opening 147 with a portion of the threaded portion 240 of the screw 214 extending beyond the negative heat sink 136. The significance of this will be described below. The screw receiving opening 156 of the positive heat sink 138 is dimensioned to receive the intermediate portion 238 of the screw 214 such that the intermediate portion 238 is press fit in the screw receiving opening 156 and thus the positive heat sink 138 is electrically connected to the prongs 232 of the terminal 216.

The screw 214 preferably has a minimum diameter of approximately five to seven millimeters thereby overcoming the problems experienced with the terminal 64 of the rectifier 50. That is, the screw 214 has an increased area through which current is conducted thereby reducing the generation of heat as current flows through the screw 214. The press fit connection is also more reliable than the solder connection in the prior art alternator 10 in that the press fit connection is not susceptible to solder reflow and disconnection of the joint during high heat conditions.

As shown in FIG. 4, the terminal 218 has one end which is connected to the terminal of one of the diode connectors of the AC insert 178. The opposite end of the terminal 218 is in the form of a prong 242 extended into the recess 220 of the connector box 212. The prong 242 of the terminal 218 is mateable with the receptacle 233 of the wiring harness 210 so as to function as a sensor post in a manner well known in the art.

As mentioned above, a problem encountered with the Ford IAR alternator is that the clip inserts disposed in the receptacles 233 of the wiring harness 210 have a tendency to expand as a result of heat under normal operating conditions under the hood of the vehicle and thus result in a loose connection between the prongs 232 and 242 of the rectifier 100. While the wiring harness 210 can be replaced when the clip inserts become excessively worn, it is desirable to not have to replace the wiring harness in that if the installation of a new wiring harness is done incorrectly, more harm than good can result to the electrical system of a vehicle. To this end, a testing device has been desired to determine when the clip inserts of the wiring harness are worn to the point that the wiring harness should be replaced.

FIG. 9 illustrates a plug tester 244. The plug tester 244 includes a shaft 246 characterized as having a first end 248, a second end 250, a stop member 252 extending from one side of the shaft 246, and a pair of ears 254 extending laterally from the shaft 246 near the second end 250 thereof. The plug tester 244 further includes a handle 256 extended from the second end 250 of the shaft 246.

The shaft 246 is preferably fabricated of a flash zinc plate 1008/1010 steel having a thickness of 0.8 mm. The shaft 246 is intended to imitate a prong of a rectifier. More specifically, the portion of the shaft 246 extending between the first end 248 and the stop member 252 is configured to imitate a prong of a Ford IAR rectifier. Thus, the stop member 252 is formed on the shaft 246, a distance from the first end 248 that is substantially equal to the length of a prong of a Ford IAR rectifier.

The plug tester 244 further includes a spring 258 which is dimensioned to be disposed about the shaft 246 with one end secured by the ears 254 and the other end extending approximate the first end 248 of the shaft 246 when the spring 258 is in a relaxed condition.

To use the plug tester 244, the shaft 246 of the plug tester 244 is inserted into a receptacle of a wiring harness, such as the receptacle 233 of the wiring harness 210, until the stop member 252 engages the outer surface of the wiring harness. As the plug tester 244 is inserted into the receptacle of the wiring harness 210, the spring 258 is caused to compress. The spring 258 is formed so that the tension of the spring 258 is approximately 2.40–2.80 Newtons when compressed to the stop member 252. As such, if the clip insert in the receptacle of the wiring harness is able to hold the plug tester 244 in place, this is an indication that the wiring harness does not need to be replaced. On the other hand, if the spring tension forces the plug tester 244 out of the wiring harness, that is an indication that the wiring harness needs to be replaced.

Although the plug tester 244 indicates that the wiring harness is in good shape, the connector clips 224 of the wiring harness often become brittle over time. Consequently, when expanding the connector clips 224 to disengage the wiring harness from the ears 222 of the connector box 212, the connector clips 224 often break. However, if the plug tester 244 indicated that the wiring harness is in good shape, it remains preferable that one does not have to replace the wiring harness.

To this end, FIG. 10 illustrates a plug lock 260. The plug lock 260 is adapted to engage a portion of the rectifier and a portion of the wiring harness so as to maintain the wiring harness in engagement with the rectifier. In particular, the plug lock 260 includes a pair of inwardly flexible tines 262 extending from a base 264. The plug lock 260 is preferably fabricated of a suitable plastic material such that the tines 262 are inwardly flexible relative to one another. Each tine 262 includes an angled distal end 266 having an outwardly extending tab 268. Each tine 262 further includes a semi-circularly shaped protrusion 270 spaced a distance from the tab 268.

Figure 11:
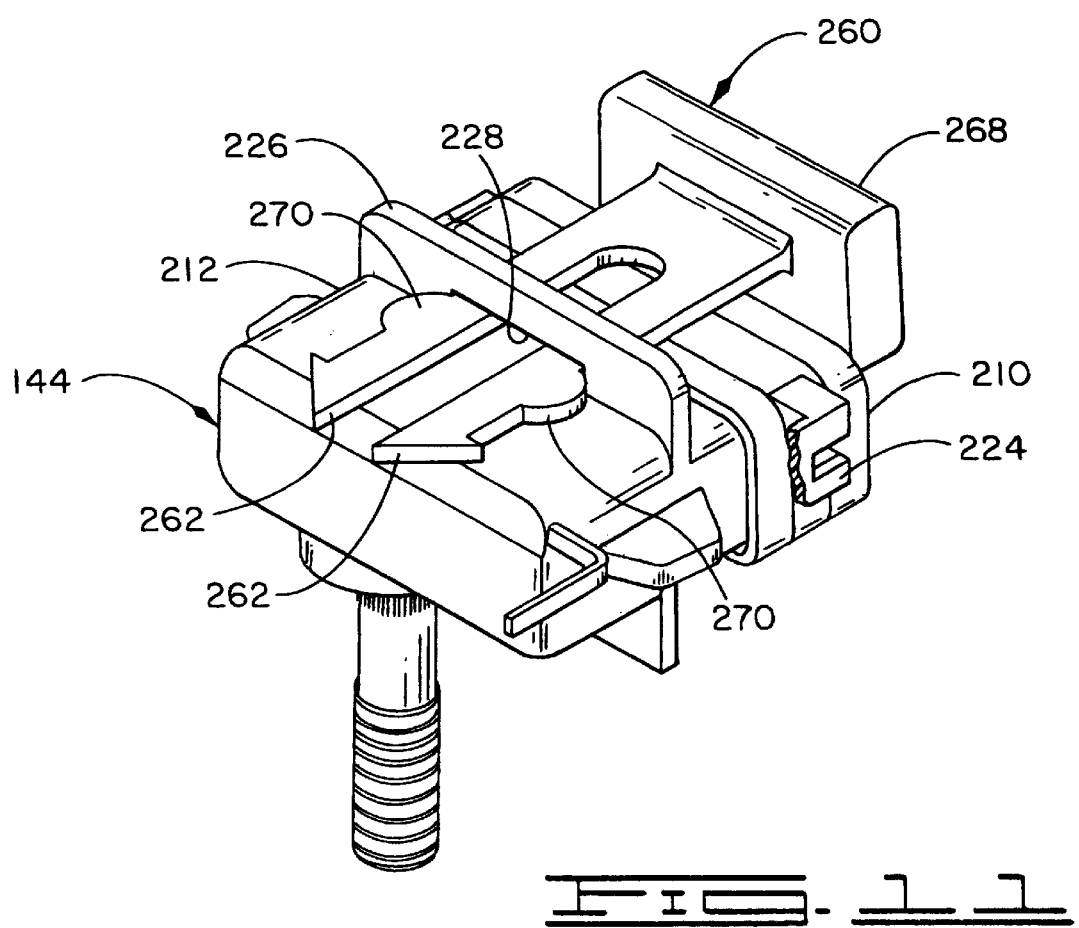
FIG. 11 is a perspective view illustrating the plug lock of FIG. 10 securing the wiring harness to the connector assembly.

FIG. 11 illustrates the plug lock 260 being used to secure the wiring harness 210 to the connector box 212 of the connector assembly 144 due to the fact that the connector clips 224 have been broken off. The plug lock 260 is inserted into the slot 228 of the connector box 212 by pressing the tines 262 inwardly until the semi-circularly shaped protrusions 270 of the tines 262 are pushed through the slot 228. The tines 262 then are allowed to expand whereby the semi-circularly shaped protrusions 270 engage a portion of the tab 226 of the connector box 212 and cooperate with the base 264 to secure the wiring harness 210 to the connector box 212. The plug lock 260 is removed by pressing the tines 262 inwardly at the opposite end from the angled distal ends 266 until the semi-circularly shaped protrusions 270 have cleared the tab 226. The plug lock 260 is then pulled from the slot 228 of the connector box 212.

Figure 12:
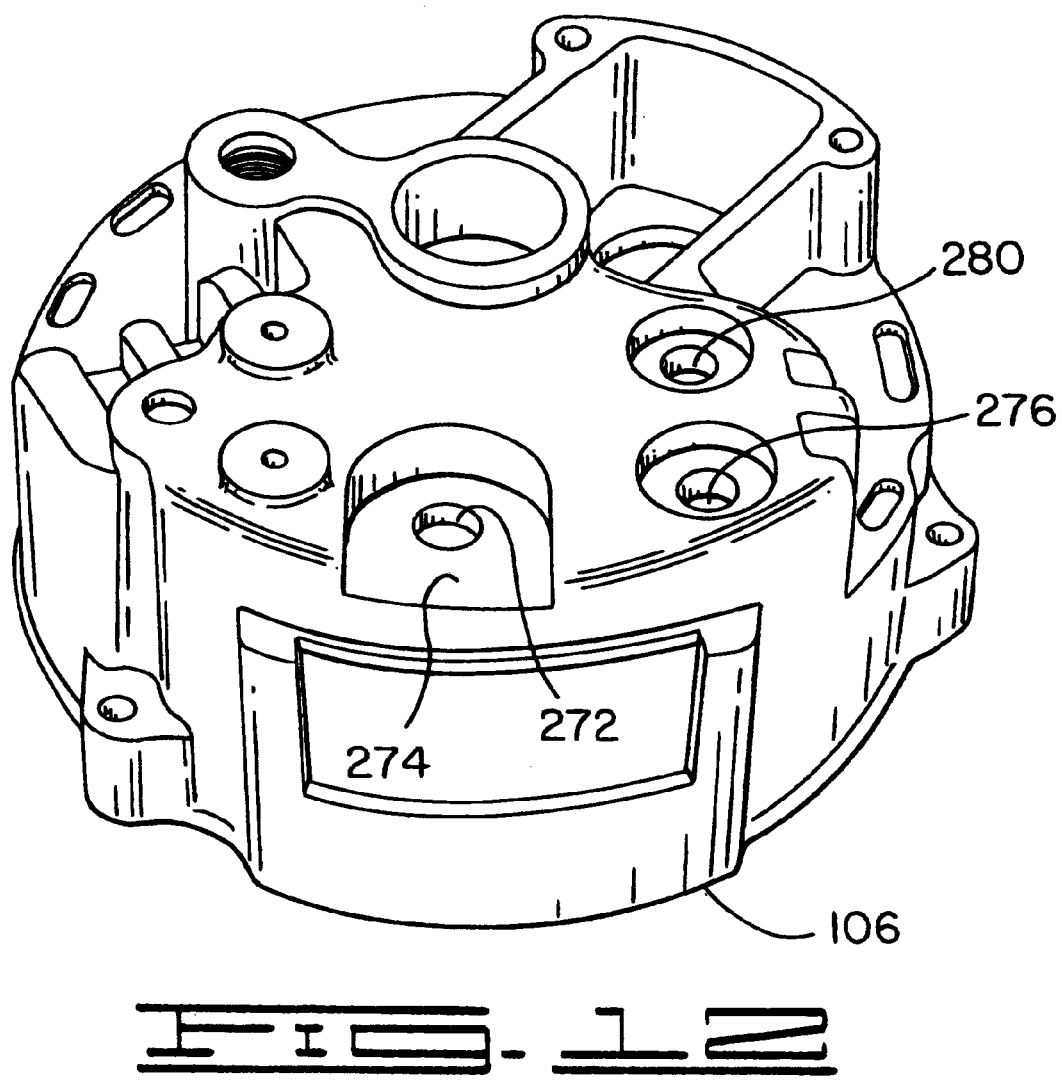
FIG. 12 is a perspective view of a slip ring end frame which is modified in accordance with the present invention.
Figure 13:
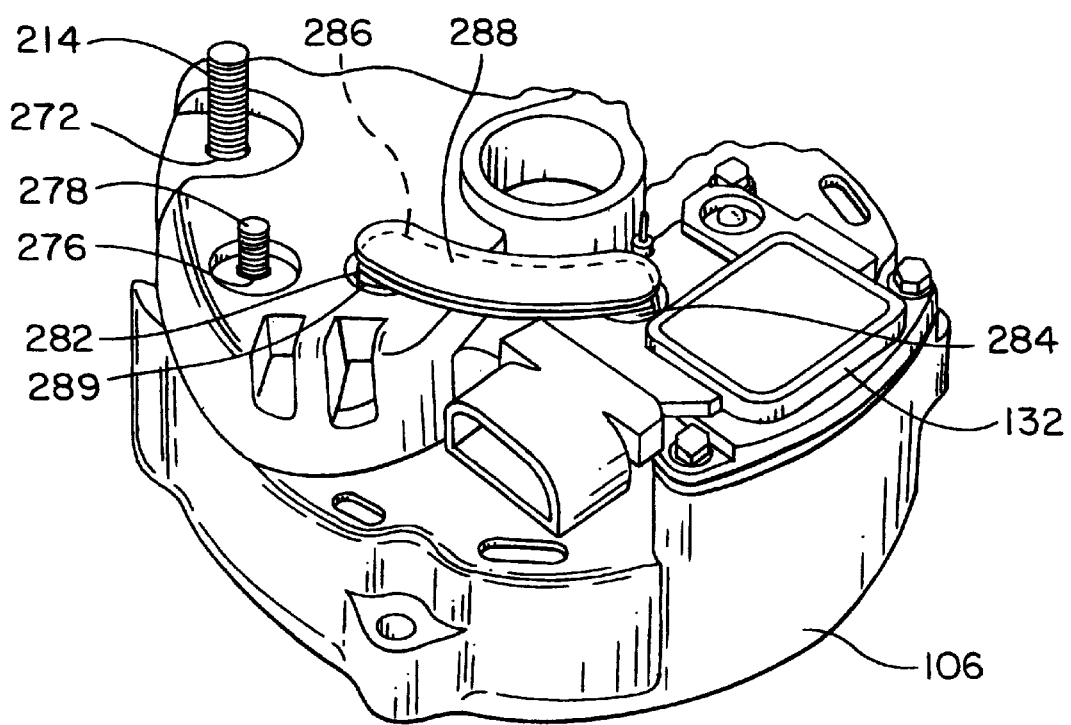
FIG. 13 is a perspective view of a portion of the alternator of the present invention illustrating a sensor strap extending between the rectifier and the voltage regulator.

Referring now to FIG. 12, the slip ring end frame 106 is illustrated. The slip ring end frame 106 is identical to the slip 19 ring end frame 18 of the alternator 10 except as noted below. That is, the slip ring end frame 106 requires minor modifications to accommodate the rectifier 102. More specifically, the slip ring end frame 106 is machined with a screw receiving opening 272 and a counter bore 274. The screw receiving opening 272 is positioned to receive the screw 214 of the connector assembly 144 when the rectifier 102 is mounted to the interior surface of the slip ring end frame 106, as illustrated in FIG. 13. As a result of the screw 214 being extended through the slip ring end frame 106, the option of making the necessary electrical connections between the battery and the rectifier 102 via the screw 214 is provided, thus eliminating the need for replacing the wiring harness 210. The battery of the vehicle can be electrically connected to the screw 214 with a conventional lead in a manner well known in the art.

The slip ring end frame 106 is further modified by machining a sensor post receiving opening 276 which is aligned with the mounting hole 182a of the cover 172 when the rectifier 102 is mounted to the slip ring end frame 106. Thus, a mounting bolt 278 (FIG. 13) extended through the mounting hole 182a of the cover 172 in contact with the portion 206 of the AC insert 178 surrounding the mounting hole 182a is capable functioning as a sensor post.

Finally, the slip ring end frame 106 is machined with an opening 280 for receiving a post or screw 282 that is disposed in electrical contact with the positive heat sink 138. As shown in FIG. 13, the opening 280 is positioned approximate to the voltage regulator 132 which is mounted to the exterior surface of the slip ring end frame 106. The voltage regulator 132 has a B+ terminal 284.

The Ford IAR alternator 10 described above is referred to as an externally sensed alternator. That is, the voltage regulator is turned on and off depending on the voltage sensed at the battery of the vehicle. The problem with sensing the voltage at the battery is that if a poor connection exists between the battery and the alternator, the voltage regulator will continue to keep trying to satisfy the voltage demand even though an increase in voltage is not required. This can create a serious fire hazard.

An internally sensed alternator is more desirable in that if a poor connection exists, the battery may end up being drained but the possibility of a fire is minimized. That is, with internally sensed alternators, the B+ terminal of the regulator is electrically connected to the B+ terminal of the rectifier such that the voltage regulator will get information of the voltage being out put by the rectifier rather than the voltage that is received by the battery.

To modify the alternator 100 from externally sensed to internally sensed, a lead 286 is extended between the B+ terminal 284 of the voltage regulator 132 and the post 282, which is extending through the opening 280, so as to electrically connect the B+ terminal 284 with the positive heat sink 138. To protect the lead 286 from being accidentally contacted, a lead cover 288 fabricated of a suitable insulating material, such as plastic, is secured over the lead 286. To protect the post 282 and the B+ terminal 284 from coming into electrical contact with slip ring end frame 106, an insulator 289 made of plastic is disposed in the opening 280.

Figure 14:
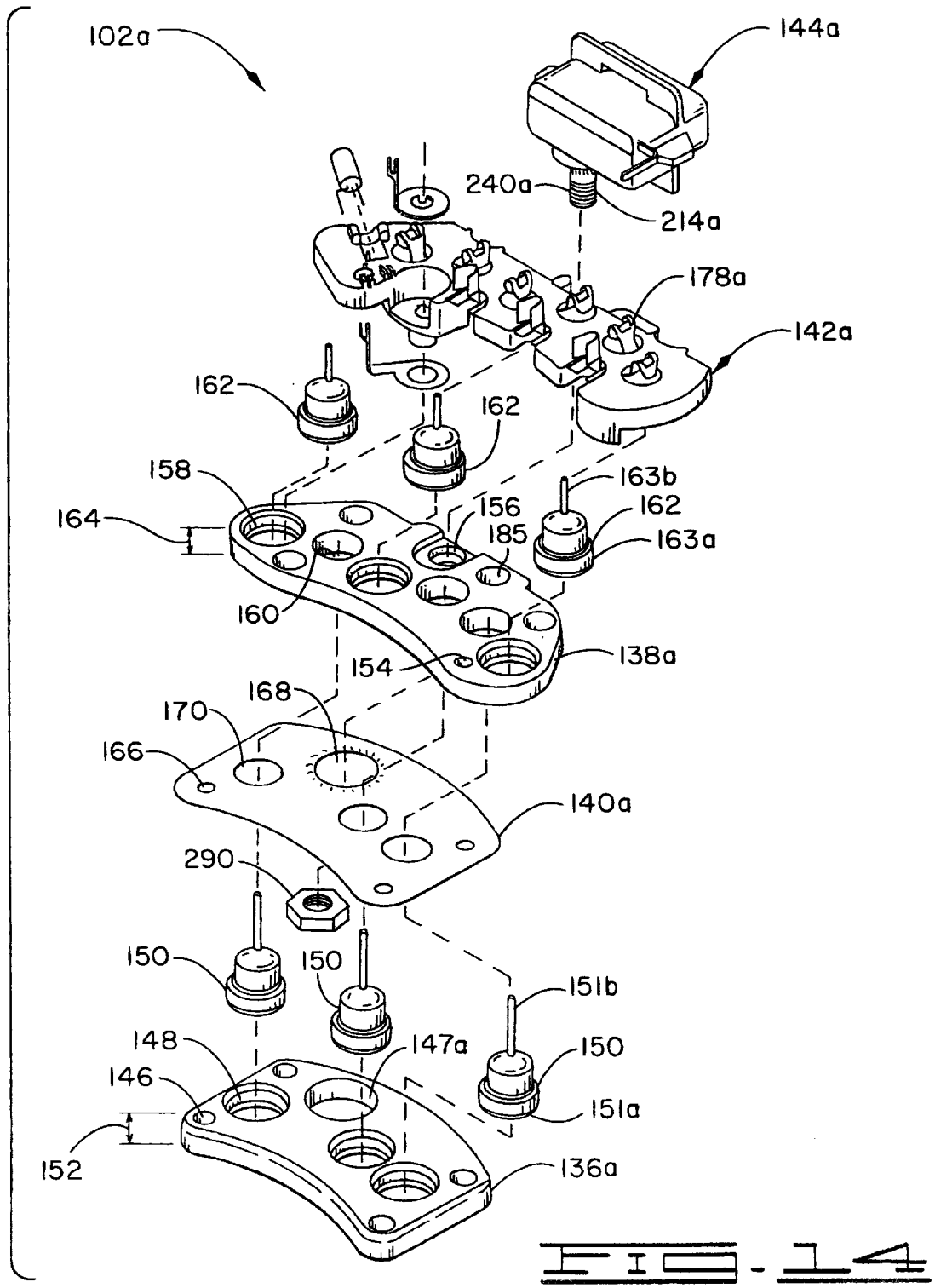
FIG. 14 is an exploded, perspective view of another rectifier constructed in accordance with the present invention.

FIG. 14 illustrates another embodiment of a rectifier 102a constructed in accordance with the present invention. The differences between the rectifier 102a and the rectifier 102 generally reflect the exclusion from the rectifier 102a of the option of making an electrical connection between the battery and the rectifier 102a via a screw.

More specifically, the rectifier 102a includes a negative heat sink 136a, a positive heat sink 138a, an insulator 140a, a terminal assembly 142a, and a connector assembly 144a. The connector assembly 144a includes a screw 214a similar in construction to the screw 214 with the exception that the screw 214a is dimensioned to terminate within a screw receiving opening 147a of the negative heat sink 136a rather than extend beyond the negative heat sink as described above in reference to the screw 214. When the connector assembly 144a is assembled with the terminal assembly 142a, the positive heat sink 138a, the insulator 140a, and the negative heat sink 136a, a nut 290 is threaded onto a threaded portion 240a of the screw 214a to enhance the connection of the connector assembly 144a to the positive heat sink 138a.

The nut 290 is received in the screw receiving opening 147a of the negative heat sink 136a. Therefore, the screw receiving opening 147a is illustrated has having a greater diameter than the diameter of the screw receiving opening 147 of negative the heat sink 136. The diameter of the screw receiving opening 147a must be large enough to accommodate the nut 290 without the nut 290 contacting the negative heat sink 136a.

The terminal assembly 142a has an AC insert 178a. The AC insert 178a is modified relative to the AC insert 178 of the terminal assembly 142 in that the AC insert 178a does not include the contact portion 206 whereby a post, such as the post 278 (FIG. 13), may be connected to the contact portion and function as a sensor post.

Figure 15:
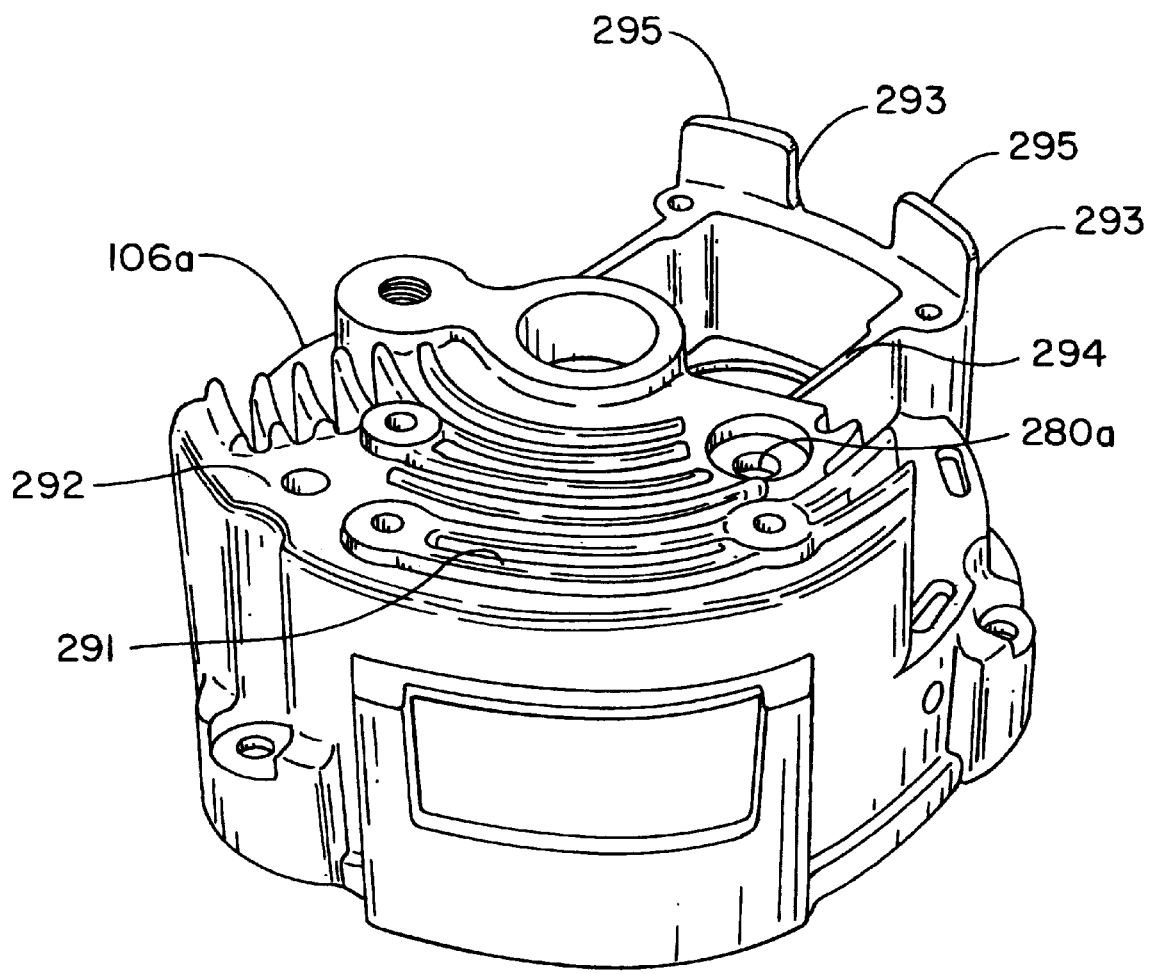
FIG. 15 is a perspective view of another embodiment of a slip ring end frame modified in accordance with the present invention.

FIG. 15 illustrates another embodiment of a slip ring end frame 106a. The slip ring end frame 106a is similar to the slip ring end frame 18 described above except as noted below. That is, the slip ring end frame 106a includes modifications to accommodate the rectifier 102a, to further increase heat dissipation from the rectifier 102a, and to protect a voltage regulator, such as the voltage regulator 132 illustrated in FIG. 13, from damage. More specifically, the slip ring end frame 106a is machined with an opening 280a for receiving a post or screw 282 that is disposed in electrical contact with the positive heat sink 138a to modify the alternator 100 from externally sensed to internally sensed in a manner similar to that described above.

The slip ring end frame 106a further machined with a plurality of fins 291 on an exterior surface 292 opposing the interior surface of the slip ring end frame 106a to which the rectifier 102a is adapted to be mounted for increasing the surface area of the slip ring end frame 106a, and thus enhancing heat transfer from the rectifier 102a.

Another problem encountered with the prior art alternator 10 described above, is it that while the alternator 10 is being handled during shipping, it is often rolled over or placed on a surface with the voltage regulator facing down. Because the voltage regulator is mounted to the exterior of the slip ring end frame, as illustrated in FIG. 13, the voltage regulator 132 is susceptible to being damaged.

To overcome this problem, The slip ring end frame 106a is further provided with a pair of ears or projections 293 for protecting a voltage regulator, such as the voltage regulator 132 illustrated in FIG. 13, from damage. The ears 293 are formed adjacent to a voltage regulator mounting surface 294 and extend away from the voltage regulator mounting surface 294. The ears 293 have a distal end 295 which will extend beyond the upper surface of the voltage regulator when the voltage regulator is mounted to the slip ring end frame 106a. Preferably, the distal end 295 of each of the ears 293 is in a substantially coplanar relationship with the fins 291 so as to create a solid base that will prevent the alternator 100 from rolling over when the alternator 100 is placed on the slip ring end frame 106a.

Figure 16:
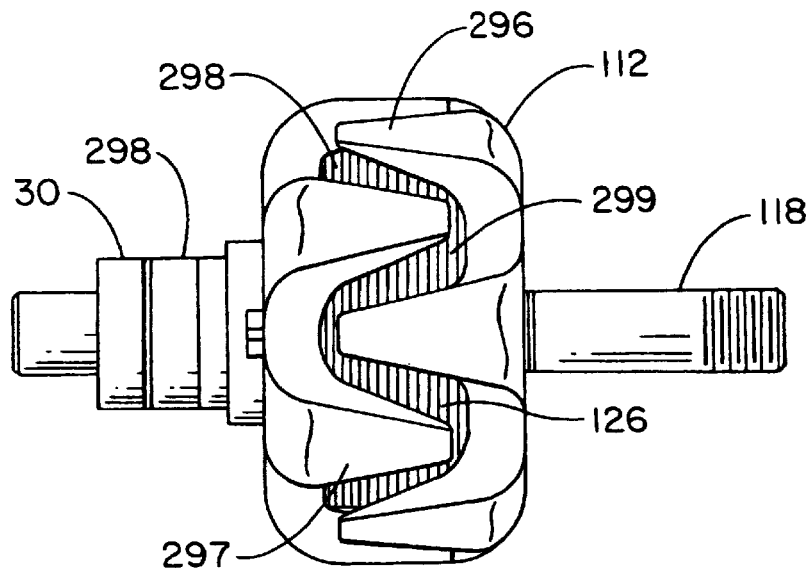
FIG. 16 is a plan view of a rotor assembly of the alternator of the present invention.

Referring now to FIG. 16, the rotor 112 will be described in greater detail. As described above, the rotor 112 includes the drive shaft 118. The rotor 112 further includes a plurality of circumferentially spaced first claw-pole fingers 296 which are supported by the drive shaft 118. Only one of the first claw-pole fingers 296 is labeled in FIG. 16 for clarity sake. The first claw-pole fingers 296 are constructed of a magnetically permeable material, such as low-carbon steel.

The rotor 112 is further provided with a plurality of circumferentially spaced second claw-pole fingers 297 which are supported by the drive shaft 118 such that the second claw-pole fingers 297 are interleaved with the first claw-pole fingers 296. Again, only one of the second claw pole fingers 297 is labeled in FIG. 16 for the sake of clarity.

The second claw-pole fingers 297 are also constructed of a magnetically permeable material, such as low-carbon steel.

A rotor coil form 298 is fixedly supported by the drive shaft 118 such that the rotor coil form 298 is disposed radially intermediate or below the first and second claw-pole fingers 296 and 297.

The rotor coil form 298 is wound with a suitable length of wire 299 thereby forming the rotor coil 126. The rotor coil form 298 is preferably wound with between about 320 to about 340 turns of about 18 to about 20 gauge wire, and more desirably wound with about 330 turns of about 20 gauge wire. The rotor coil form 298 can be wound with a GP-200 insulated copper magnet wire obtainable from Essex Group, Inc., of Fort Wayne, Indiana.

It should be noted that the rotor coil form 298 of the present invention is wound with about 17 additional turns or windings of wire of a slightly larger gauge as the wire wound on the rotor coil form of the prior art alternator 10. These additional turns or windings of wire contribute to an increased electrical output of the alternator 100 of the present invention and lower field current.

Winding systems and services for winding the wire 299 about the rotor coil form 298 are available from BACHI, L.P., Itasca, Ill.

To supply electricity to the wire 299 which is wound about the rotor coil form 298 so that the wire 299 generates a rotating magnetic field as the rotor 112 rotates, the rotor 112 is provided with a pair of slip rings 134. The slip rings 134 are electrically connected to the wire 299 and mounted on the drive shaft 118.

The stator 124 of the present invention cooperates with the rotor 112 to increase the electrical current output of the alternator 100 by about 53 percent at about 1600 RPMs as compared to the prior art alternator 10. The stator 124 is positioned in the rotating magnetic field generated by the rotor coil 126 of the rotor 112 and is clamped between the drive end frame 104 and the slip ring end frame 106 (FIG. 3) such that the stator 124 is supported by the drive end frame 104 and the slip ring end frame 106 when the alternator 100 is in an assembled condition.

The stator 124 is shown in more detail in FIGS. 17–20. The stator 124 includes the stator lamination 130 (FIGS. 17–20) and the plurality of stator windings 128 (FIGS. 19 and 20) wound about the stator lamination 130.

The stator lamination 130 is formed from a plurality of layers (FIG. 19) of a laminated magnetically permeable material (as depicted by the spaced apart vertical lines on the stator lamination 130), such as low carbon steel, which have been bonded together in a conventional manner. The stator lamination 130 has an opening 302 (FIG. 17) and a plurality of equally spaced-apart poles 304 disposed circumferentially about the opening 302. Only three of the poles are labeled in FIG. 15 for purposes of clarity.

Figure 19:
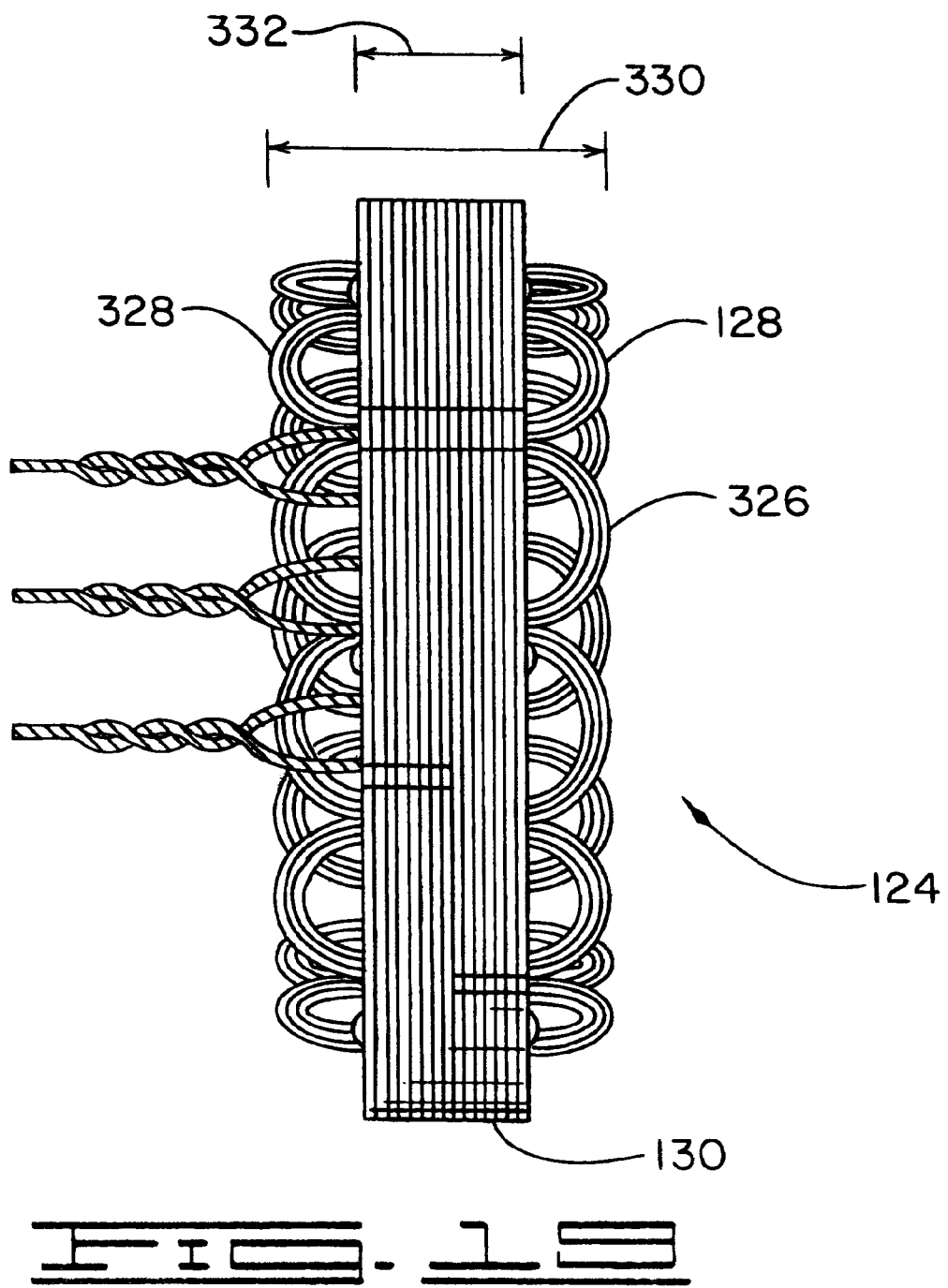
FIG. 19 is a side view of a stator assembly of the replacement alternator of the present invention showing the stator assembly formed from a plurality of stator windings wound onto the stator lamination of FIG. 17.

Each adjacently disposed pair of poles 304 defines a slot 306 (FIGS. 17, 18, and 20) therebetween which is adapted to receive the stator windings 128 therein (FIGS. 19 and 20). Only two of the slots 306 are labeled in FIGS. 17 and 18. Each slot 306 has an inward end 308, an outward end 310, and a length 312 extending generally between the inward end 308 and the outward end 310. The length 312 of each of the slots 306 is about 19.23 mm to about 19.43 mm. Desirably, the stator lamination 130 is provided with 36 poles 304 to provide the stator lamination 130 with 36 equally spaced slots 306.

The opening 302 of the stator lamination 130 is sized to receive the rotor 112 such that the rotor 112 can freely rotate therein. The stator lamination 130 has an inner diameter 314 (FIG. 17) extending across the opening 302 therein, an outer diameter 316 (FIG. 17) and a thickness 318 (FIG. 18) extending between the outward end 310 of the slots 306 and the outer surface of the stator lamination 130. The inner diameter 314 of the stator lamination 130 is about 96.57 mm to about 96.67 mm. The outer diameter 316 can vary between about 132.90 mm to about 133.40 mm. The thickness 318 of the stator lamination 130 can be about 6.79 mm to about 6.89 mm.

It will be appreciated that the construction of the stator lamination 130 is substantially identical to the construction of the stator lamination 42 of the prior art alternator 10 shown in FIG. 1. However, it should be noted that the length 312 of the slots 306 of the stator lamination 130 can be increased as compared to the slots (not shown) in the stator lamination 42 of the prior art alternator 10 so that the length 312 of the slots 306 formed in the stator lamination 130 is about 1 mm longer than the length (not shown) of the slots formed in the stator lamination 42 of the prior art alternator 10. In this embodiment, the inner diameter 314 of the stator lamination 130 is substantially different from the inner diameter (not shown) of the stator lamination 42 of the prior art alternator 10 and the thickness 318 of the stator lamination 130 is substantially identical to the thickness (not shown) of the stator lamination 42 of the prior art alternator 10. However, the outer diameter 316 of the stator lamination 130 of the present invention is substantially the same as the outer diameter (not shown) of the stator lamination 42 of the prior art alternator 10. The increased length of the slots 306 increases the number of turns or windings of wire that can be made on the stator lamination 130. The additional turns or windings of wire per each slot 306 formed in the stator lamination 130 contributes to the increased electrical current output by the stator 124 of the present invention while also permitting the alternator 100 to be disposed in the predetermined alternator space within the vehicle where the prior art Ford IAR alternator 10 was disposed. It should be noted that in one embodiment of the present invention at least 13 turns of about 14½ gauge wire connected in Delta manner is provided in each of the slots 306 formed in the stator lamination 130, as compared to 8 turns of 14 gauge wire connected in a wye manner in the stator lamination 42 of the prior art alternator 10.

As best shown in FIG. 18, each pole 304 is provided with a first lip 320 and a second lip 322. The first lip 320 extends from one side of the pole 304 and the second lip 322 extends from the opposing side of the pole 304. The first lip 320 of one pole 304 is spaced a distance of about 2.40 mm to about 2.50 mm from the second lip 322 of an adjacently disposed pole 304 to form a wire receiving passageway therebetween.

As shown in FIG. 19, the stator windings 128 of the stator 124 are wound through the slots 306 of the stator lamination 130, typically in a delta connected, three phase configuration. The stator windings 128 are looped between the slots 306 to form a plurality of first wire loop portions 326 extending a distance outwardly beyond one side of the stator lamination 130 and a plurality of second wire loop portions 328 extending outwardly beyond the opposing side of the stator lamination 130. Only one of the first wire loop portions 326 and one of the second wire loop portions 328 are labeled in FIG. 19.

The stator 124 has a width 330 extending between an outermost portion of the first wire loop portions 326 and an outermost portion of the second wire loop portions 328, and the stator lamination 130 has a width 332.

The width 332 of the stator lamination 130 of the present invention is substantially identical to the width (not shown) of the stator lamination 42 of the prior art alternator 10.

The stator windings 128 can be maintained within the slots 306 in the stator lamination 130 by any manner known in the art. For example, a wedge 334 (FIG. 20) can be inserted into each of the slots 306 after the stator windings 128 are disposed therein. The wedge 334 engages the first and second lips 320 and 322 of the poles 304 to maintain the stator windings 128 within the slots 306.

Systems and services for winding the stator windings 128 onto the stator lamination 130 are available from Windamatic Systems of Hunterstown, Ind. or Advanced Machine and Tool of Fort Wayne, Ind.

The power output of the alternator 100 of the present invention and the prior art alternator 10 were tested and the results of such tests are depicted in the graph set forth as FIG. 21. The test data obtained on the prior art alternator 10 are represented in FIG. 21 by the dashed lines and the test data obtained on the replacement alternator 100 are represented in FIG. 21 by the solid lines.

Initially, the alternator 100 and the prior art alternator 10 were operated at a speed of about 5000 RPMs at a substantially uniform output voltage of about 13 volts for a period of time sufficient to stabilize the output current of such alternators (about 10 minutes). The replacement alternator 100 and the prior art alternator 10 were then selectively operated at speeds between 1000 rpms and 6000 rpms in increments of 200 rpms. The output currents of the alternators 10 and 100 were obtained at each of the speeds while the output voltages of such alternators were maintained at 13 volts.

As depicted in FIG. 21, at a speed of about 1600 rpms the output current of the alternator 100 was 52 amperes, whereas the output current of the prior art alternator 10 was 34 amperes. Thus, the current output of the replacement alternator 100 is about 53% greater than the current output of the prior art alternator 10 when such alternators are operated at a speed of about 1600 rpms.

From the above description it is clear that the present invention is well adapted to carry out the objects and to attain the advantages mentioned herein as well as those inherent in the invention. While presently preferred embodiments of the invention has been described for purposes of this disclosure, it will be understood that numerous changes may be made which will readily suggest themselves to those skilled in the art. Thus, changes may be made in the embodiments of the invention described herein, or in the parts or the elements of the embodiments described herein, or in the steps or sequence of steps of the methods described herein, without departing from the spirit and/or the scope of the invention as defined in the following claims.

What is claimed is:

1. In a Ford IAR alternator having a rotor and a stator housed in a frame, the frame having an external mounting surface to which a voltage regulator is mounted and electrically connected to the rotor and an internal mounting surface to which a rectifier is mounted and electrically connected to the stator, the rectifier having a connector assembly including a connector box having a recess adapted to matingly receive a wiring harness, the improvement comprising:

a tab formed on an outer surface of the connector box; and means for releasably engaging a portion of the tab and for releasably engaging a portion of the wiring harness so as to maintain the wiring harness in operable engagement with the rectifier when the wiring harness is matingly received in the recess of the connector box.

2. The improvement of claim 1 wherein the tab has a slot extending therethrough and wherein the engaging means comprises:

a base having a surface releasably engageable with a portion of the wiring harness; and a pair of tines extending from the base in a spaced apart, parallel relationship so as to be disposable into the slot of the tab, each tine having an outwardly extending protrusion spaced from the base such that the protrusions are retainingly engaged with a portion of the tab so as to cooperate with the base to secure the wiring harness to the connector box when the wiring harness is operably connected to the connector box of the rectifier.

3. The improvement of claim 2 wherein each of the tines is inwardly flexible.

4. In a Ford IAR alternator having a rotor and a stator housed in a frame, the frame having an external mounting surface to which a voltage regulator is mounted and electrically connected to the rotor and an internal mounting surface to which a rectifier is mounted and electrically connected to the stator, the rectifier having a connector assembly including a connector box having a recess adapted to matingly receive a wiring harness, the improvement comprising:

the connector box having a slot formed on the exterior thereof; and a plug lock having a portion positionable through the slot and releasably engageable with a portion of the connector box and another portion releasably engageable with a portion of the wiring harness so as to maintain the wiring harness in operable engagement with the rectifier when the wiring harness is matingly received in the recess of the connector box.

5. The improvement of claim 4 and wherein the plug lock further comprises:

a base having a surface releasably engaged with a portion of the wiring harness; and a pair of tines extending from the base in a spaced apart, parallel relationship so as to be disposable into the slot of the tab, each tine having an outwardly extending protrusion spaced from the base such that the protrusions are retainingly engaged with a portion of the tab so as to cooperate with the base to secure the wiring harness to the connector box when the wiring harness is operably connected to the connector box of the rectifier.

6. The improvement of claim 5 wherein each of the tines is inwardly flexible.

7. In a Ford IAR alternator having a rotor and a stator housed in a frame, the frame having an external mounting surface to which a voltage regulator is mounted and electrically connected to the rotor and an internal mounting surface to which a rectifier is mounted and electrically connected to the stator, the rectifier having a connector assembly including a connector box having a recess adapted to matingly receive a wiring harness, the connector box having a pair of outwardly extending ears and the wiring harness having a pair of corresponding connector clips for releasably engaging the ears to secure the wiring harness to the connector box, the improvement comprising:

a tab formed on an outer surface of the connector box; and means for releasably engaging a portion of the tab and for releasably engaging a portion of the wiring harness so as to maintain the wiring harness in operable engagement with the rectifier in alternative to the ears and the connector clips when the wiring harness is matingly received in the recess of the connector box.

8. The improvement of claim 7 wherein the tab has a slot extending therethrough and wherein the engaging means comprises:

a base having a surface releasably engageable with a portion of the wiring harness; and a pair of tines extending from the base in a spaced apart, parallel relationship so as to be disposable into the slot of the tab, each tine having an outwardly extending protrusion spaced from the base such that the protrusions are retainingly engaged with a portion of the tab so as to cooperate with the base to secure the wiring harness to the connector box when the wiring harness is operably connected to the connector box of the rectifier.

9. The improvement of claim 8 wherein each of the tines is inwardly flexible.

10. In a Ford IAR alternator having a rotor and a stator housed in a frame, the frame having an external mounting surface to which a voltage regulator is mounted and electrically connected to the rotor and an internal mounting surface to which a rectifier is mounted and electrically connected to the stator, the rectifier having a connector assembly including a connector box having a recess adapted to matingly receive a wiring harness, the connector box having a pair of outwardly extending ears and the wiring harness having a pair of corresponding connector clips for releasably engaging the ears to secure the wiring harness to the connector box, the improvement comprising:

the connector box having a slot formed on the exterior thereof; and a plug lock having a portion positionable through the slot and releasably engageable with a portion of the connector box and another portion releasably engageable with a portion of the wiring harness so as to maintain the wiring harness in operable engagement with the rectifier in alternative to the ears and connector clips when the wiring harness is matingly received in the recess of the connector box.

11. The improvement of claim 10 and wherein the plug lock further comprises:

a base having a surface releasably engaged with a portion of the wiring harness; and a pair of tines extending from the base in a spaced apart, parallel relationship so as to be disposable into the slot of the tab, each tine having an outwardly extending protrusion spaced from the base such that the protrusions are retainingly engaged with a portion of the tab so as to cooperate with the base to secure the wiring harness to the connector box when the wiring harness is operably connected to the connector box of the rectifier.

12. The improvement of claim 11 wherein each of the tines is inwardly flexible.

* * * * *

UNITED STATES PATENT AND TRADEMARK OFFICE
CERTIFICATE OF CORRECTION

PATENT NO. : 6,140,722
DATED : October 31, 2000
INVENTOR(S) : Michael D. Ballard and Larry Joe Maddox It is certified that error appears in the above-identified patent and that said Letters Patent is hereby corrected as shown below:

Drawings,
FIG. 11, please delete the numeral "268" and substitute therefor -- 264 --.

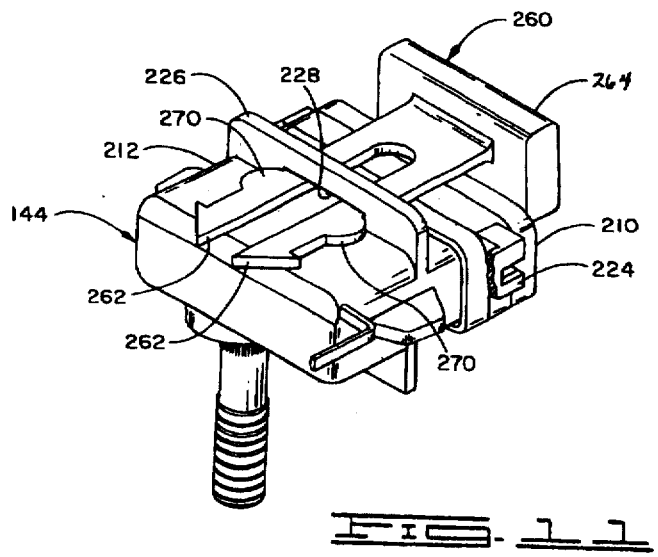

FIG. 21, please delete the word "IMPROVE" and substitute therefor -- IMPROVED --.

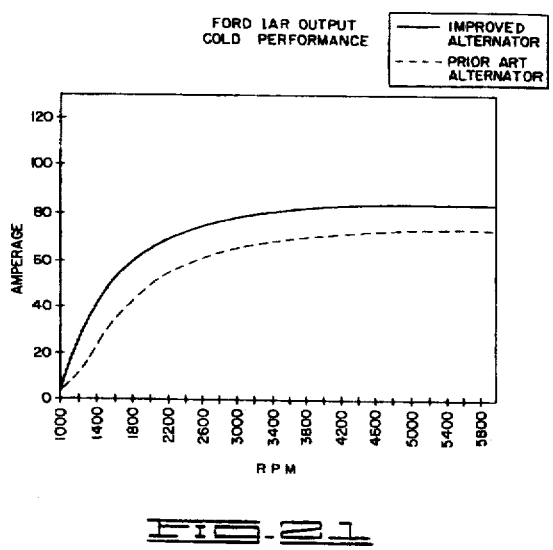

UNITED STATES PATENT AND TRADEMARK OFFICE
CERTIFICATE OF CORRECTION

PATENT NO. : 6,140,722
DATED : October 31, 2000
INVENTOR(S) : Michael D. Ballard and Larry Joe Maddox It is certified that error appears in the above-identified patent and that said Letters Patent is hereby corrected as shown below:

Title page,
Item "[75] Inventors:" delete the currently named inventors and substitute therefor the following: Michael D. Ballard and Larry Joe Maddox.

Column 5,
Line 10, delete "filed" and substitute -- field -- therefor.
Line 62, delete "alternator 10" and substitute therefor -- alternator 100 --.

Column 11,
Lines 12-13, delete "approximate" and substitute therefor -- proximate --.

Column 12,
Line 3, delete "negative the" and substitute therefor -- the negative --.
Line 11, delete "post 278" and substitute -- post 282 -- therefor.
Line 22, delete "screw 282" and substitute therefor -- screw 282a --.
Line 33, after "is" and before "that" delete "it".

Figure 17:
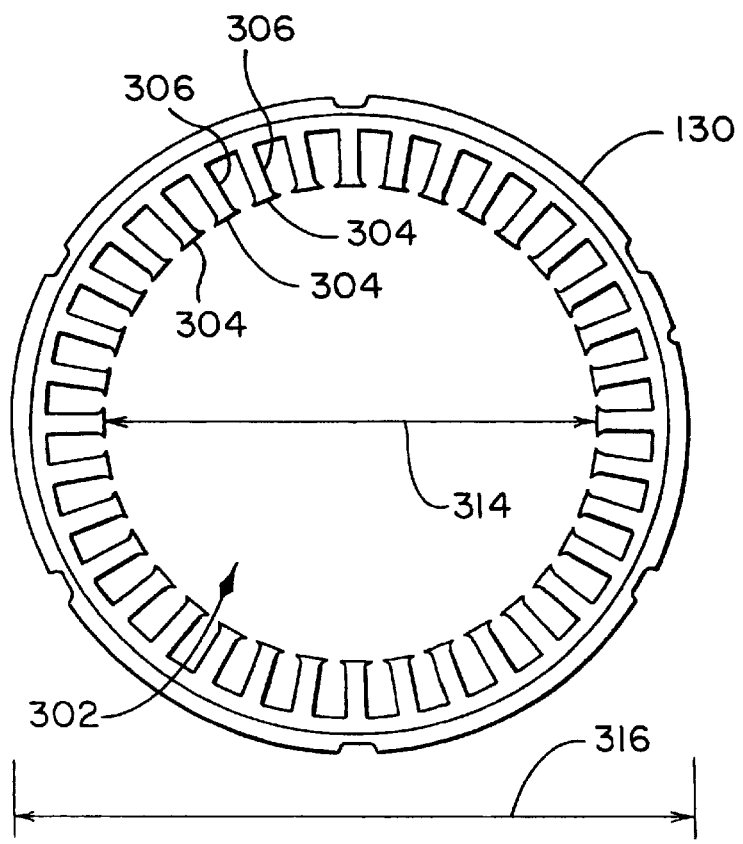
FIG. 17 is a plan view of a stator lamination of a stator assembly of the alternator of the present invention.

Column 13,
Line 53, delete "FIG. 15" and substitute therfor -- FIG. 17 --.

Signed and Sealed this

Twelfth Day of February, 2002

Attest:

*Attesting Officer*

JAMES E. ROGAN
*Director of the United States Patent and Trademark Office*